US012230218B2

(12) United States Patent
Park et al.

(10) Patent No.: US 12,230,218 B2
(45) Date of Patent: Feb. 18, 2025

(54) DISPLAY DEVICE AND DISPLAY DRIVING METHOD BASED ON SENSING SUBPIXELS CHARACTERISTICS

(71) Applicant: LG Display Co., Ltd., Seoul (KR)

(72) Inventors: Jaesung Park, Seoul (KR); SeongHwan Hong, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/470,201

(22) Filed: Sep. 19, 2023

(65) Prior Publication Data

US 2024/0177679 A1 May 30, 2024

(30) Foreign Application Priority Data

Nov. 29, 2022 (KR) ........................ 10-2022-0162715

(51) Int. Cl.

*G09G 3/3266* (2016.01)
*G09G 3/3291* (2016.01)
*G09G 3/36* (2006.01)

(52) U.S. Cl.

CPC ......... *G09G 3/3266* (2013.01); *G09G 3/3291* (2013.01); *G09G 3/3677* (2013.01); *G09G 3/3688* (2013.01); *G09G 2310/08* (2013.01); *G09G 2330/021* (2013.01); *G09G 2330/12* (2013.01)

(58) Field of Classification Search

CPC ... G09G 3/32–3291; G09G 3/36–3696; G09G 2300/0421–043; G09G 2310/0243; G09G 2310/0251; G09G 2310/0264; G09G 2310/0267; G09G 2310/06; G09G 2310/08; G09G 2320/0233; G09G 2320/0242; G09G 2320/029; G09G 2320/0295; G09G 2320/043–048; G09G 2330/021; G09G 2330/028; G09G 2330/12

See application file for complete search history.

(56) References Cited

U.S. PATENT DOCUMENTS

2011/0090319 A1* 4/2011 Kim ..................... G09G 3/3648 348/51
2021/0201814 A1* 7/2021 Choi .................... G09G 3/3258
2021/0201816 A1* 7/2021 Kim ..................... G09G 3/3266
2021/0202907 A1* 7/2021 Lee ...................... G09G 3/3208

* cited by examiner

*Primary Examiner* — Nathan Danielsen

(74) *Attorney, Agent, or Firm* — Seed IP Law Group LLP

(57) ABSTRACT

Embodiments of the disclosure relate to a display device and a display driving method. Specifically, there may be provided a display device comprising a display panel having a plurality of subpixels, a gate driving circuit supplying a plurality of scan signals to the display panel through a plurality of gate lines, a data driving circuit supplying a plurality of data voltages to the display panel through a plurality of data lines, a power management circuit supplying a plurality of driving voltages to the gate driving circuit and the data driving circuit, and a timing controller controlling the power management circuit to change a level of a gate voltage applied to the gate driving circuit according to an output state of the gate driving circuit.

20 Claims, 14 Drawing Sheets

DISPLAY DEVICE AND DISPLAY DRIVING METHOD BASED ON SENSING SUBPIXELS CHARACTERISTICS

CROSS-REFERENCE TO RELATED APPLICATION

This application claims priority from Korean Patent Application No. 10-2022-0162715, filed on Nov. 29, 2022, which is hereby incorporated by reference for all purposes as if fully set forth herein.

BACKGROUND

Technical Field

Embodiments of the disclosure relate to a display device and a display driving method, and more particularly, to a display device and a display driving method capable of eliminating image artifacts by stably driving a gate driving circuit.

Description of the Related Art

Representative display devices for displaying an image based on digital data include liquid crystal display (LCD) devices using liquid crystal and organic light emitting display devices using organic light emitting diodes OLEDs.

Among these display devices, the organic light emitting displays adopt light emitting diodes and thus have fast responsiveness and various merits in contrast ratio, luminous efficiency, brightness, and viewing angle. In this case, the light emitting diode may be implemented with an inorganic material or an organic material.

The organic light emitting diode display includes light emitting diode in subpixels arranged on the display panel and enables the light emitting diodes to emit light by controlling the current flowing to the light emitting diodes, thereby controlling the brightness represented by each subpixel while displaying an image.

In such a display device, light emitting elements and subpixel circuits for driving the light emitting elements may be disposed on a display panel. For example, the subpixel circuit includes a driving transistor for controlling a driving current flowing through the light emitting element, and at least one scan transistor for controlling a gate-source voltage of the driving transistor according to a scan signal. The scan transistor of the subpixel circuit may be controlled by the scan signal output from the gate driving circuit disposed on the substrate of the display panel.

However, as the driving time of the display device increases, the transistor constituting the gate driving circuit may deteriorate, and thus image quality may reduce.

BRIEF SUMMARY

Accordingly, embodiments of the disclosure may provide a display device and a display driving method capable of stably operating the gate driving circuit by effectively detecting the deterioration state of the gate driving circuit.

Embodiments of the disclosure may provide a display device and a display driving method capable of effectively detecting the deterioration state of a gate driving circuit using a sensing voltage for a characteristic value of a subpixel circuit.

Further, embodiments of the disclosure may provide a display device and a display driving method capable of stably operating a gate driving circuit by controlling a gate voltage based on a sensing voltage for a characteristic value of a subpixel circuit.

Embodiments of the disclosure may provide a display device comprising a display panel having a plurality of subpixels, a gate driving circuit supplying a plurality of scan signals to the display panel through a plurality of gate lines, a data driving circuit supplying a plurality of data voltages to the display panel through a plurality of data lines, a power management circuit supplying a plurality of driving voltages to the gate driving circuit and the data driving circuit, and a timing controller controlling the power management circuit to change a level of a gate voltage applied to the gate driving circuit according to an output state of the gate driving circuit.

Embodiments of the disclosure may provide a display driving method comprising setting a test gate voltage, detecting a sensing voltage for a characteristic value of a subpixel disposed on a display panel, determining whether the sensing voltage corresponds to a multi-output value, setting the test gate voltage as an error gate voltage when the sensing voltage corresponds to the multi-output value, determining a stable gate voltage, and applying the stable gate voltage to a gate driving circuit.

According to embodiments of the disclosure, it is possible to stably operate the gate driving circuit by effectively detecting the deterioration state of the gate driving circuit.

Further, according to embodiments of the disclosure, it is possible to effectively detect the deterioration state of the gate driving circuit using the sensing voltage for the characteristic value of the subpixel circuit.

Further, according to embodiments of the disclosure, it is possible to stably operate the gate driving circuit by controlling the gate voltage based on the sensing voltage for the characteristic value of the subpixel circuit.

BRIEF DESCRIPTION OF THE SEVERAL VIEWS OF THE DRAWINGS

The above and other objects, features, and advantages of the disclosure will be more clearly understood from the following detailed description, taken in conjunction with the accompanying drawings, in which.

DETAILED DESCRIPTION

Figure 1:
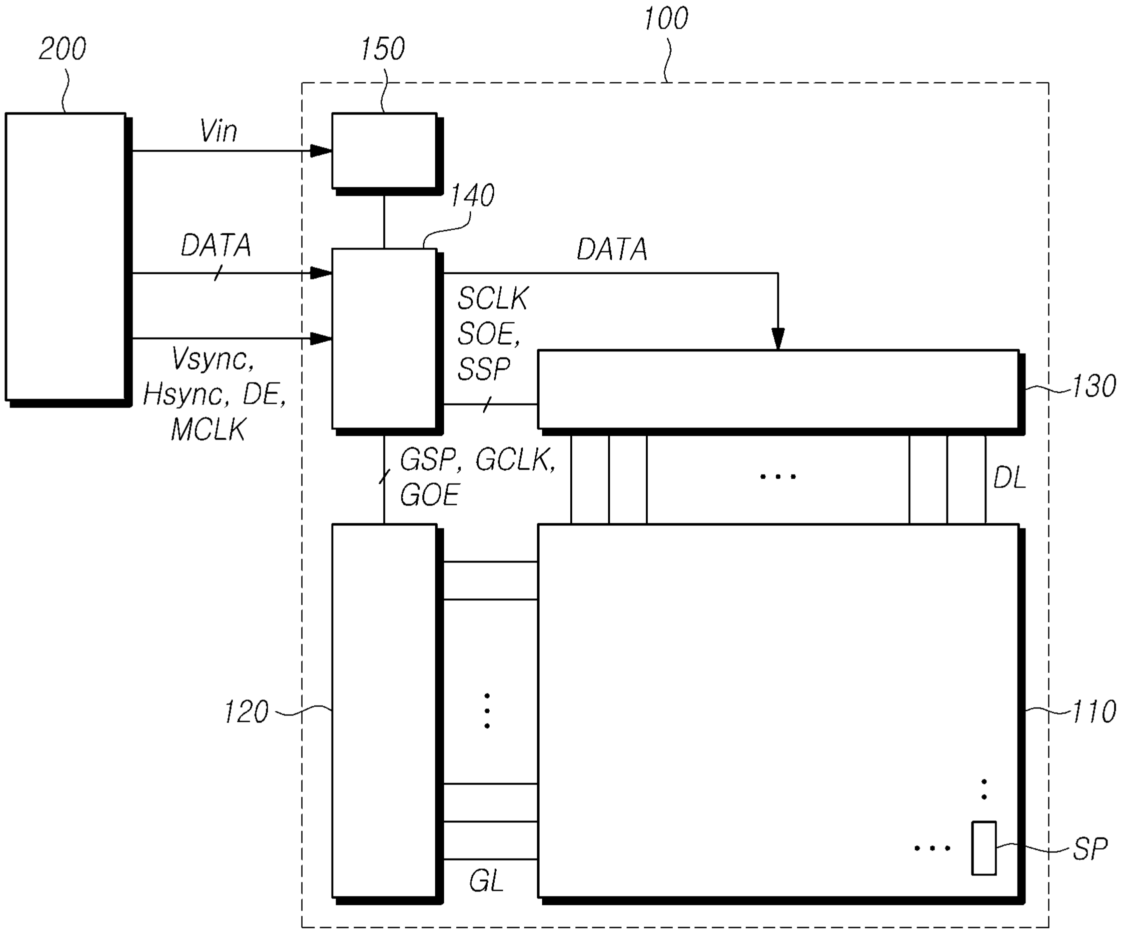
FIG. 1 is a view schematically illustrating a configuration of a display device according to various embodiments of the disclosure.

Hereinafter, some embodiments of the disclosure will be described in detail with reference to example drawings. In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as “including,” “having,” “containing,” “constituting” “make up of,” and “formed of” used herein are generally intended to allow other components to be added unless the terms are used with the term “only.” As used herein, singular forms are intended to include plural forms unless the context clearly indicates otherwise.

Terms, such as “first,” “second,” “A,” “B,” “A,” or “B” may be used herein to describe elements of the disclosure. Each of these terms is not used to define essence, order, sequence, or number of elements, etc., but is used merely to distinguish the corresponding element from other elements.

When it is mentioned that a first element “is connected or coupled to,” “contacts or overlaps,” etc., a second element, it should be interpreted that, not only can the first element “be directly connected or coupled to” or “directly contact or overlap” the second element, but a third element can also be “interposed” between the first and second elements, or the first and second elements can “be connected or coupled to,” “contact or overlap,” etc., each other via a fourth element. Here, the second element may be included in at least one of two or more elements that “are connected or coupled to,” “contact or overlap,” etc., each other.

When time relative terms, such as “after,” “subsequent to,” “next,” “before,” and the like, are used to describe processes or operations of elements or configurations, or flows or steps in operating, processing, manufacturing methods, these terms may be used to describe non-consecutive or non-sequential processes or operations unless the term “directly” or “immediately” is used together.

In addition, when any dimensions, relative sizes, etc., are mentioned, it should be considered that numerical values for an elements or features, or corresponding information (e.g., level, range, etc.) include a tolerance or error range that may be caused by various factors e.g., process factors, internal or external impact, noise, etc.) even when a relevant description is not specified. Further, the term “may” fully encompasses all the meanings of the term “can”.

Hereinafter, various embodiments of the disclosure will be described in detail with reference to the accompanying drawings.

FIG. 1 is a view schematically illustrating a configuration of a display device according to various embodiments of the disclosure.

Referring to FIG. 1, a display device 100 according to an embodiment of the disclosure may include a display panel 110 where a plurality of gate lines GL and data lines DL are connected, and a plurality of subpixels SP are arranged in a matrix form, a gate driving circuit 120 driving the plurality of gate lines GL, a data driving circuit 130 supplying a data voltage through the plurality of data lines DL, a timing controller 140 controlling the gate driving circuit 120 and the data driving circuit 130, and a power management circuit (power management integrated circuit (IC)) 150.

The display panel 110 displays an image based on a scan signal transferred from the gate driving circuit 120 through the plurality of gate lines GL and the data voltage transferred from the data driving circuit 130 through the plurality of data lines DL.

In the case of a liquid crystal display, the display panel 110 may include a liquid crystal layer formed between two substrates and may be operated in any known mode, such as a twisted nematic (TN) mode, a vertical alignment (VA) mode, an in-plane switching (IPS) mode, or a fringe field switching (FFS) mode. In the case of an organic light emitting display, the display panel 110 may be implemented in a top emission scheme, a bottom emission scheme, or a dual-emission scheme.

In the display panel 110, a plurality of pixels may be arranged in a matrix form, and each pixel may include subpixels SP having different colors, e.g., a white subpixel, a red subpixel, a green subpixel, and a blue subpixel, and each subpixel SP may be connected to the plurality of data lines DL and the plurality of gate lines GL.

One subpixel SP may include, e.g., a thin film transistor (TFT) formed at the intersection between one data line DL and one gate line GL, a light emitting element, such as an organic light emitting diode, charged with the data voltage, and a storage capacitor electrically connected to the light emitting element to maintain the voltage.

For example, when the display device 100 having a resolution of 2,160×3,840 includes four subpixels SP of white (W), red (R), green (G), and blue (B), 3,840 data lines DL may be connected to 2,160 gate lines GL and four subpixels WRGB, and thus, there may be provided 3,840×4=15,360 data lines DL. Each subpixel SP is disposed at the intersection between the gate line GL and the data line DL.

The gate driving circuit 120 may be controlled by the controller 140 to sequentially output scan signals to the plurality of gate lines GL disposed in the display panel 110, controlling the driving timing of the plurality of subpixels SP.

In the display device 100 having a resolution of 2,160×3,840, sequentially outputting the scan signal to the 2,160 gate lines GL from the first gate line to the 2,160th gate line may be referred to as 2,160-phase driving. Sequentially outputting the scan signal to each unit of four gate lines GL, e.g., sequentially outputting the scan signal to the fifth gate line to the eighth gate line after sequentially outputting the scan signal to the first gate line to the fourth gate line, is referred to as 4-phase driving. In other words, sequentially outputting the scan signal to every N gate lines GL may be referred to as N-phase driving.

The gate driving circuit 120 may include one or more gate driving integrated circuits (GDICs). Depending on driving schemes, the gate driving circuit 120 may be positioned on only one side, or each of two opposite sides, of the display panel 110. The gate driving circuit 120 may be implemented in a gate-in-panel (GIP) form which is embedded in the bezel area of the display panel 110.

The data driving circuit 130 receives image data DATA from the timing controller 140 and converts the received image data DATA into an analog data voltage. Then, as the data voltage is output to each data line DL according to the timing when the scan signal is applied through the gate line GL, each subpixel SP connected to the data line DL displays a light emitting signal having the brightness corresponding to the data voltage.

Likewise, the data driving circuit 130 may include one or more source driving integrated circuits SDIC, and the source driving integrated circuit SDIC may be connected to the bonding pad of the display panel 110 in a tape automated bonding (TAB) type or a chip-on-glass (COG) type or may be disposed directly on the display panel 110.

In some cases, each source driving integrated circuit SDIC may be integrated and disposed on the display panel 110. Further, each source driving integrated circuit SDIC may be implemented in a chip-on-film (COF) type and, in this case, each source driving integrated circuit SDIC may be mounted on a circuit film and may be electrically connected to the data line DL of the display panel 110 through the circuit film.

The timing controller 140 supplies various control signals to the gate driving circuit 120 and the data driving circuit 130 and controls the operation of the gate driving circuit 120 and the data driving circuit 130. In other words, the timing controller 140 may control the gate driving circuit 120 to output a scan signal according to the timing implemented in each frame and, on the other hand, transfers the image data DATA received from the outside to the data driving circuit 130.

In this case, the timing controller 140 receives, from an external host system 200, several timing signals including, e.g., a vertical synchronization signal Vsync, a horizontal synchronization signal Hsync, a data enable signal DE, and a main clock MCLK, together with the image data DATA.

The host system 200 may be any one of a television (TV) system, a set-top box, a navigation system, a personal computer (PC), a home theater system, a mobile device, and a wearable device.

Accordingly, the timing controller 140 may generate a control signal according to various timing signals received from the host system 200 and transfers the control signal to the gate driving circuit 120 and the data driving circuit 130.

For example, the timing controller 140 outputs several gate control signals including, e.g., a gate start pulse GSP, a gate clock GCLK, and a gate output enable signal GOE, to control the gate driving circuit 120. The gate start pulse GSP controls the timing at which one or more gate driving integrated circuits GDIC constituting the gate driving circuit 120 start operation. The gate clock GCLK is a clock signal commonly input to one or more gate driving integrated circuits GDIC and controls the shift timing of the scan signal. The gate output enable signal GOE designates timing information about one or more gate driving integrated circuits GDICs.

The timing controller 140 outputs various data control signals including, e.g., a source start pulse SSP, a source sampling clock SCLK, and a source output enable signal SOE, to control the data driving circuit 130. The source start pulse SSP controls the timing at which one or more source driving integrated circuits SDIC constituting the data driving circuit 130 start data sampling. The source sampling clock SCLK is a clock signal that controls the timing of sampling data in the source driving integrated circuit SDIC. The source output enable signal SOE controls the output timing of the data driving circuit 130.

The display device 100 may further include a power management circuit 150 that supplies various voltages or currents to, e.g., the display panel 110, the gate driving circuit 120, and the data driving circuit 130 or controls various voltages or currents to be supplied.

The power management circuit 150 adjusts the direct current (DC) input voltage Vin supplied from the host system 200, generating power to drive the display panel 100, the gate driving circuit 120, and the data driving circuit 130.

The subpixel SP is positioned at the intersection between the gate line GL and the data line DL, and a light emitting element may be disposed in each subpixel SP. For example, the organic light emitting diode display may include a light emitting element, such as an organic light emitting diode, in each subpixel SP and may display an image by controlling the current flowing to the light emitting element according to the data voltage.

The display device 100 may be one of various types of devices, such as liquid crystal displays, organic light emitting diode displays, or plasma display panels.

Figure 2:
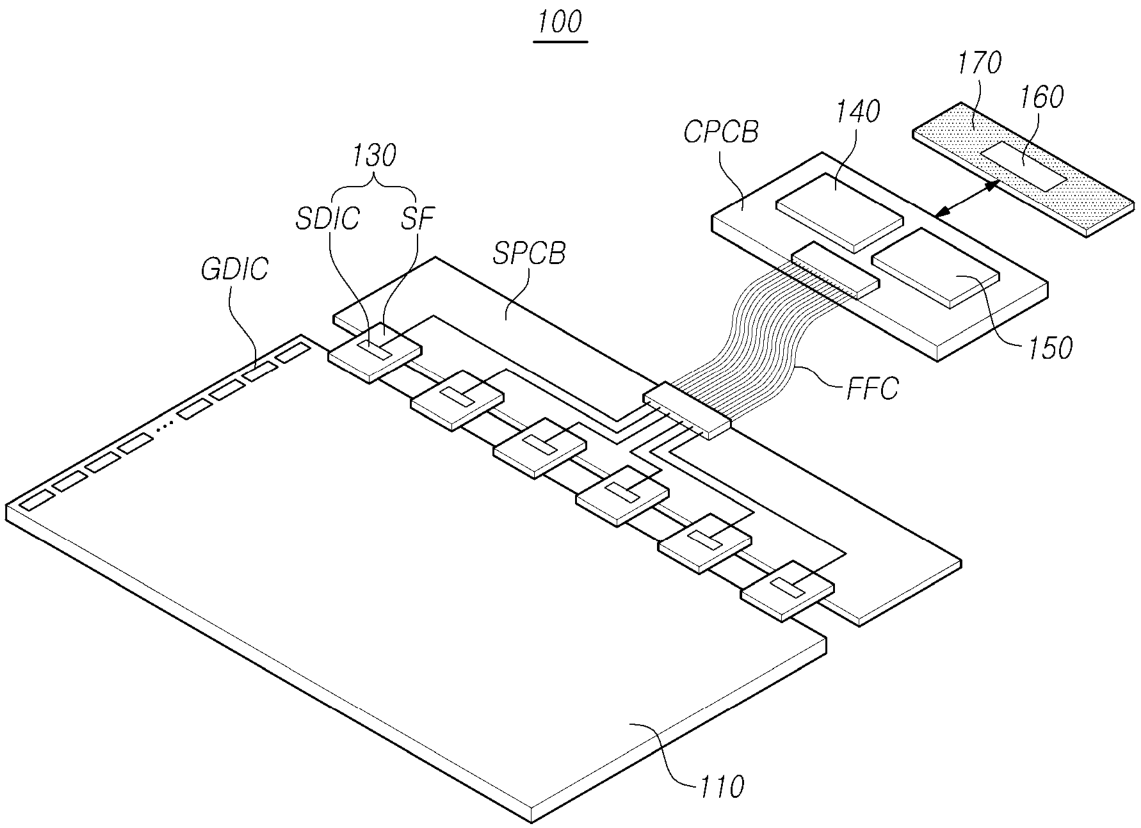
FIG. 2 is a view illustrating an example of a system of a display device according to embodiments of the disclosure.

FIG. 2 is a view illustrating an example of a system of a display device according to embodiments of the disclosure;

Referring to FIG. 2, in the display device 100 according to embodiments of the disclosure, the source driving integrated circuit SDIC included in the data driving circuit 130 is implemented in a chip-on-film (COF) type among various types (e.g., TAB, COG, or COF), and the gate driving circuit 120 is implemented in a gate-in-panel (GIP) type among various types (e.g., TAB, COG, COF, or GIP).

When the gate driving circuit 120 is implemented in the GIP type, the plurality of gate driving integrated circuits GDIC included in the gate driving circuit 120 may be directly formed in the bezel area of the display panel 110. In this case, the gate driving integrated circuits GDIC may receive various signals (e.g., a clock signal, a gate high signal, a gate low signal, etc.) used for generating scan signals through gate driving-related signal lines disposed in the bezel area.

Likewise, one or more source driving integrated circuits SDIC included in the data driving circuit 130 each may be mounted on the source film SF, and one side of the source film SF may be electrically connected with the display panel 110. Lines for electrically connecting the source driver integrated circuit SDIC and the display panel 110 may be disposed on the source film SF.

The display device 100 may include at least one source printed circuit board SPCB for circuit connection between a plurality of source driving integrated circuits SDIC and other devices and a control printed circuit board CPCB for mounting control components and various electric devices.

The other side of the source film SF where the source driving integrated circuit SDIC is mounted may be connected to at least one source printed circuit board SPCB. In other words, one side of the source film SF where the source driving integrated circuit SDIC is mounted may be electrically connected with the display panel 110, and the other side thereof may be electrically connected with the source printed circuit board SPCB.

The timing controller 140 and the power management circuit (power management IC) 150 may be mounted on the control printed circuit board CPCB. The timing controller 140 may control the operation of the data driving circuit 130 and the gate driving circuit 120. The power management circuit 150 may supply driving voltage or current to the display panel 110, the data driving circuit 130, and the gate driving circuit 120 and control the supplied voltage or current.

At least one source printed circuit board SPCB and control printed circuit board CPCB may be circuit-connected through at least one connection member. The connection member may include, e.g., a flexible printed circuit FPC or a flexible flat cable FFC. The at least one source printed circuit board SPCB and control printed circuit board CPCB may be integrated into a single printed circuit board.

The display device 100 may further include a set board 170 electrically connected to the control printed circuit board CPCB. In this case, the set board 170 may also be referred to as a power board. A main power management circuit (M-PMC) 160 for managing the overall power of the display device 100 may be disposed on the set board 170. The main power management circuit 160 may interwork with the power management circuit 150.

In the so-configured display device 100, the driving voltage is generated in the set board 170 and transferred to the power management circuit 150 in the control printed circuit board CPCB. The power management circuit 150 transfers a driving voltage necessary for display driving or characteristic value sensing to the source printed circuit board SPCB through the flexible printed circuit FPC or flexible flat cable FFC. The driving voltage transferred to the source printed circuit board SPCB is supplied to emit light or sense a specific subpixel SP in the display panel 110 through the source driving integrated circuit SDIC.

Each of the subpixels SP arranged in the display panel 110 in the display device 100 may include a light emitting element and a circuit element, e.g., a driving transistor, for driving the organic light emitting diode.

The type and number of circuit elements constituting each subpixel SP may be varied depending on functions to be provided and design schemes.

Figure 3:
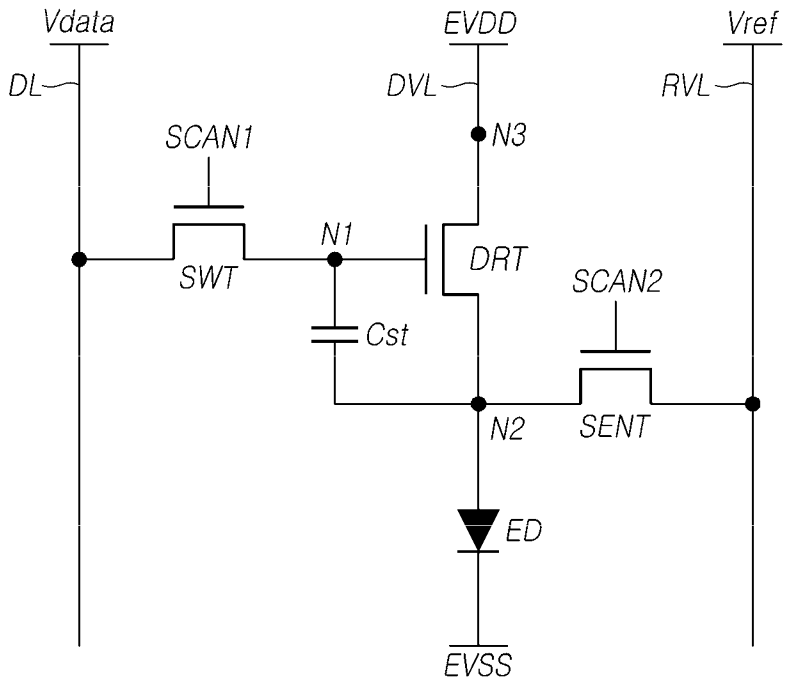
FIG. 3 is a view illustrating an example of a circuit constituting a subpixel in a display device according to embodiments of the disclosure.

FIG. 3 is a view illustrating an example of a circuit constituting a subpixel in a display device according to embodiments of the disclosure.

Referring to FIG. 3, in the display device 100 according to embodiments of the disclosure, the subpixel SP may include one or more transistors and a capacitor and may have a light emitting element disposed therein.

For example, the subpixel SP may include a driving transistor DRT, a switching transistor SWT, a sensing transistor SENT, a storage capacitor Cst, and a light emitting diode ED.

The driving transistor DRT includes the first node N1, second node N2, and third node N3. The first node N1 of the driving transistor DRT may be a gate node to which the data voltage Vdata is applied from the data driving circuit 130 through the data line DL when the switching transistor SWT is turned on.

The second node N2 of the driving transistor DRT may be electrically connected with the anode electrode of the light emitting diode ED and may be the source node or drain node.

The third node N3 of the driving transistor DRT may be electrically connected with the driving voltage line DVL to which the subpixel driving voltage EVDD is applied and may be the drain node or the source node.

In this case, during a display driving period, a subpixel driving voltage EVDD for displaying an image may be supplied to the driving voltage line DVL. For example, the subpixel driving voltage EVDD for displaying an image may be 27V.

The switching transistor SWT is electrically connected between the first node N1 of the driving transistor DRT and the data line DL, and the gate line GL is connected to the gate node. Thus, the switching transistor SWT is operated according to the first scan signal SCAN1 supplied through the gate line GL. When turned on, the switching transistor SWT transfers the data voltage Vdata supplied through the data line DL to the gate node of the driving transistor DRT, thereby controlling the operation of the driving transistor DRT.

The sensing transistor SENT is electrically connected between the second node N2 of the driving transistor DRT and the reference voltage line RVL, and the gate line GL is connected to the gate node. The sensing transistor SENT is operated according to the second scan signal SCAN2 supplied through the gate line GL. When the sensing transistor SENT is turned on, a reference voltage Vref supplied through the reference voltage line RVL is transferred to the second node N2 of the driving transistor DRT.

In other words, as the switching transistor SWT and the sensing transistor SENT are controlled, the voltage of the first node N1 and the voltage of the second node N2 of the driving transistor DRT are controlled, so that the current for driving the light emitting diode ED may be supplied.

The gate nodes of the switching transistor SWT and the sensing transistor SENT may be commonly connected to one gate line GL or may be connected to different gate lines GL. An example is shown in which the switching transistor SWT and the sensing transistor SENT are connected to different gate lines GL in which case the switching transistor SWT and the sensing transistor SENT may be independently controlled by the first scan signal SCAN1 and the second scan signal SCAN2 transferred through different gate lines GL.

In contrast, if the switching transistor SWT and the sensing transistor SENT are connected to one gate line GL, the switching transistor SWT and the sensing transistor SENT may be simultaneously controlled by the first scan signal SCAN1 or second scan signal SCAN2 transferred through one gate line GL, and the aperture ratio of the subpixel SP may be increased.

The transistor disposed in the subpixel SP may be an n-type transistor or a p-type transistor and, in the shown example, the transistor is an n-type transistor.

The storage capacitor Cst is electrically connected between the first node N1 and second node N2 of the driving transistor DRT and maintains the data voltage Vdata during one frame.

The storage capacitor Cst may also be connected between the first node N1 and third node N3 of the driving transistor DRT depending on the type of the driving transistor DRT. The anode electrode of the light emitting diode ED may be electrically connected with the second node N2 of the driving transistor DRT, and a base voltage EVSS may be applied to the cathode electrode of the light emitting diode ED.

The base voltage EVSS may be a ground voltage or a voltage higher or lower than the ground voltage. The base voltage EVSS may be varied depending on the driving state. For example, the base voltage EVSS at the time of display driving and the base voltage EVSS at the time of sensing driving may be set to differ from each other.

The switching transistor SWT and the sensing transistor SENT may be referred to as scan transistors controlled through scan signals SCAN1 and SCAN2.

The structure of the subpixel SP may further include one or more transistors or, in some cases, further include one or more capacitors.

To effectively sense a characteristic value, e.g., threshold voltage or mobility, of the driving transistor DRT, the display device 100 of the disclosure may use a method for measuring the current flowed by the voltage charged to the storage capacitor Cst during a characteristic value sensing period of the driving transistor DRT, which is called current sensing.

In other words, it is possible to figure out the characteristic value, or a variation in characteristic value, of the driving transistor DRT in the subpixel SP by measuring the current flowed by the voltage charged to the storage capacitor Cst during the characteristic value sensing period of the driving transistor DRT.

In this case, the reference voltage line RVL serves not only to transfer the reference voltage Vref but also as a sensing line for sensing the characteristic value of the driving transistor DRT in the subpixel. Thus, the reference voltage line RVL may also be referred to as a sensing line or a sensing channel.

More specifically, the characteristic value or a change in the characteristic value of the driving transistor DRT may correspond to a difference between the gate node voltage and the source node voltage of the driving transistor DRT.

The compensation for the characteristic value of the driving transistor DRT may be performed by external compensation that senses and compensates for the characteristic value of the driving transistor DRT using an external compensation circuit or internal compensation that senses and compensates for the characteristic value of the driving transistor DRT inside the subpixel SP, rather than using an additional external configuration.

In this case, the external compensation may be performed before the display device 100 is shipped out, and the internal compensation may be performed after the display device 100 is shipped out. However, internal compensation and external compensation may be performed together even after the display device 100 is shipped out.

Figure 4:
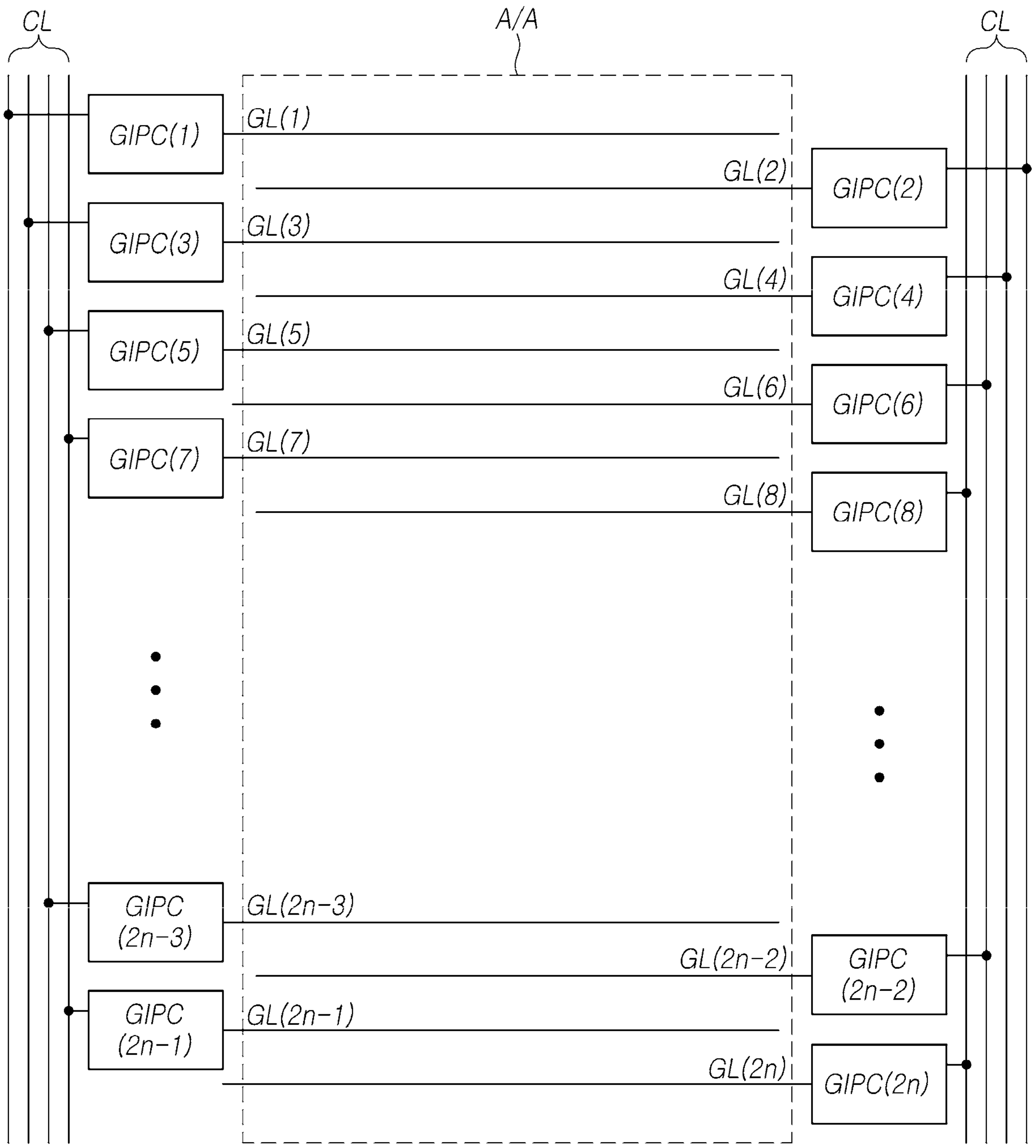
FIG. 4 is a view illustrating an example of a display panel in which a gate driving circuit is implemented in a GIP type in a display device according to embodiments of the disclosure.

FIG. 4 is a view illustrating an example of a display panel in which a gate driving circuit is implemented in a GIP type in a display device according to embodiments of the disclosure.

Referring to FIG. 4, in the display device 100 according to embodiments of the disclosure, 2n gate lines GL(1) to GL(**2*n*) (where n is a natural number) may be disposed in the display area A/A for displaying an image in the display panel 110**.

In this case, the gate driving circuit 120 may include 2n GIP circuits (GIP Circuit) GIPC corresponding to 2n gate lines GL(1) to GL(**2*n*) and embedded and disposed in the non-display area corresponding to the outer portion of the display area A/A of the display panel 110**.

Accordingly, the 2n GIP circuits GIPC may output the scan signal SCAN to the 2n gate lines GL(1) to GL(**2*n***).

As such, when the gate driving circuit 120 is implemented in a GIP type, it is not necessary to form a separate integrated circuit having a gate driving function and bond it to the display panel 110. Thus, it is possible to reduce the number of integrated circuits and omit the process of connecting the integrated circuits to the display panel 110. It is also possible to reduce the size of the bezel area for bonding the integrated circuit in the display panel 110.

The 2n GIP circuits GIPC may be denoted as GIPC(1), GIPC(2), . . . GIPC(**2*n*) to be distinguished from each other and to identify a correspondence relationship between the 2n gate lines GL(1) to GL(2*n***).

Shown here is an example in which the 2n GIP circuits GIPC(1) to GIPC(**2*n*) are disposed on two divided sides of the display area A/A. For example, among the 2n GIP circuits GIPC(1) to GIPC(2*n*), the odd-numbered GIP circuits GIPC(1), GIPC(3), . . . , GIPC(2*n*−1) may drive the odd-numbered gate line GL(1), GL(3), . . . , GL(2*n*−1). Among the 2n GIP circuits GIPC(1) to GIPC(2*n*), the even-numbered GIP circuits GIPC(2), GIPC(4), . . . , GIPC (2*n*) may drive the even-numbered gate lines GL(2), GL (4), . . . , GL(2*n***).

Alternatively, the 2n GIP circuits GIPC(1) to GIPC(**2*n***) may be disposed on only one side of the display area A/A.

A plurality of clock signal lines CL for transferring gate clocks for generating and outputting the scan signal SCAN to the gate driving circuit 120 may be disposed in the non-display area corresponding to the outer portion of the display area A/A of the display panel 110.

Figure 5:
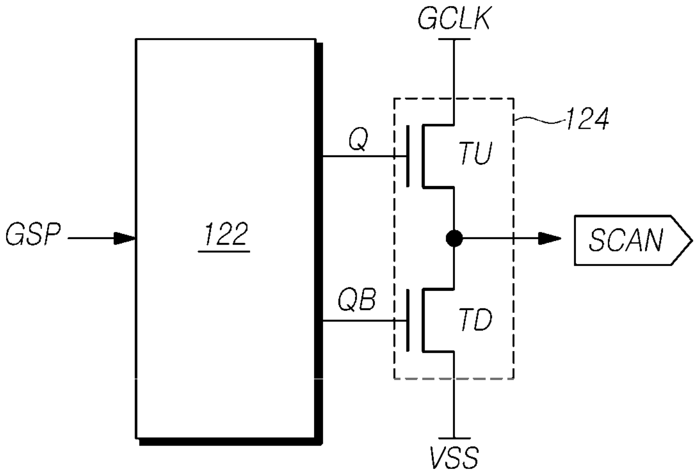
FIG. 5 is a block diagram schematically illustrating a configuration of a gate driving circuit in a display device according to embodiments of the disclosure.

FIG. 5 is a block diagram schematically illustrating a configuration of a gate driving integrated circuit in a display device according to embodiments of the disclosure.

Referring to FIG. 5, in the display device 100 according to embodiments of the disclosure, one gate driving integrated circuit may include a shift register 122 and a buffer circuit 124.

The gate driving integrated circuit starts to operate according to the gate start pulse GSP and outputs the scan signal SCAN according to the gate clock GCLK. The scan signal SCAN output from the gate driving integrated circuit is sequentially shifted and sequentially supplied through the gate line GL.

The buffer circuit 124 has two nodes Q and QB important to the gate driving state and may include a pull-up transistor TU and a pull-down transistor TD. The gate node of the pull-up transistor TU may correspond to the Q node, and the gate node of the pull-down transistor TD may correspond to the QB node.

The shift register 122 may also be referred to as a shift logic circuit and may be used to generate the scan signal SCAN in synchronization with the gate clock GCLK.

The shift register 122 may control the Q node and the QB node connected to the buffer circuit 124 so that the buffer circuit 124 may output the scan signal SCAN and, to this end, may include a plurality of transistors.

The shift register 122 starts to generate the scan signal SCAN, and the output of the shift register 122 is sequentially turned on according to the gate clock GCLK. In other words, it is possible to transfer the logic state for sequentially determining on/off of the gate line GL by controlling the output time of the shift register 122 using the gate clock GCLK.

According to the shift register 122, the respective voltage states of the Q node and the QB node of the buffer circuit 124 may be different. Accordingly, the buffer circuit 124 may output a voltage for turning on the corresponding gate line GL (e.g., which corresponds to a high-level voltage or low-level voltage and may be, e.g., a signal having the gate high voltage VGH) to the corresponding gate line GL or a voltage for turning on the corresponding gate line GL (e.g., which corresponds to a low-level voltage or high-level voltage and may be, e.g., a base voltage VSS having the gate low voltage VGL) to the corresponding gate line GL.

Meanwhile, one gate driving integrated circuit may further include a level shifter in addition to the shift register 122 and the buffer circuit 124.

In this case, the shift register 122 and the buffer circuit 124 constituting the gate driving integrated circuit may be connected in various structures.

Figure 6:
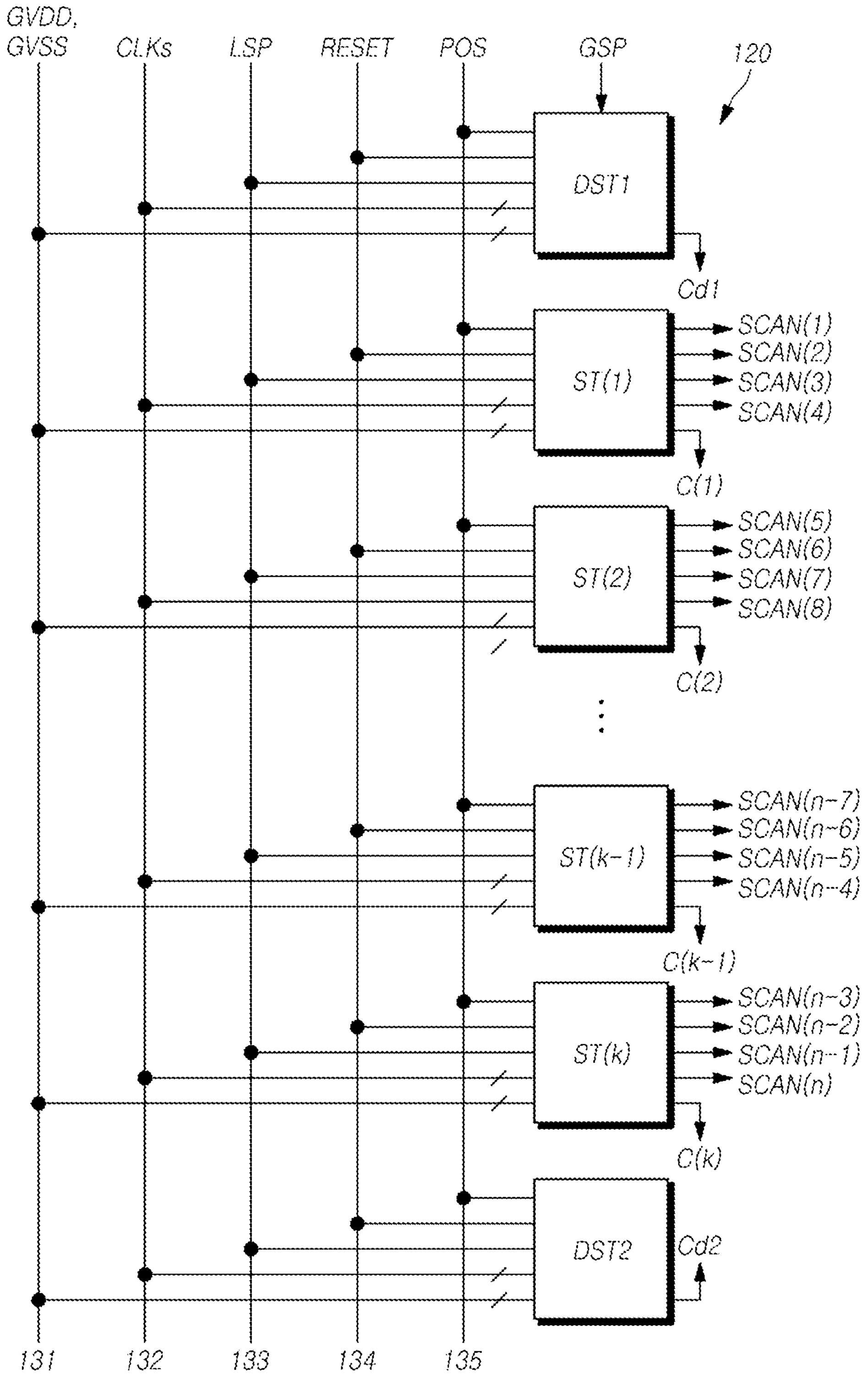
FIG. 6 is a view illustrating a configuration of a plurality of stage circuits constituting a gate driving circuit according to embodiments of the disclosure.

FIG. 6 is a view illustrating a configuration of a plurality of stage circuits constituting a gate driving circuit according to embodiments of the disclosure.

Referring to FIG. 6, the gate driving circuit 120 according to another embodiment of the disclosure includes first to kth stage circuits ST(1) to ST(k) (where k is a positive integer), a gate voltage line 131, a clock signal line 132, a line sensing signal line 133, and a reset signal line 134.

Here, each stage circuit ST may correspond to a gate driving integrated circuit GDIC or a GIP circuit GIPC constituting the gate driving circuit 120.

Further, the gate driving circuit 120 may further include a previous dummy stage circuit DST1 disposed before the first stage circuit ST(1) and a subsequent dummy stage circuit DST2 disposed after the kth stage circuit ST(k).

The gate voltage line 131 applies the high-potential gate voltage GVDD and the low-potential gate voltage GVSS supplied from the power management circuit 150 to each of the first to kth stage circuits ST(1) to ST(k), the previous dummy stage circuit DST1, and the subsequent dummy stage circuit DST2.

The gate voltage line 131 may include a plurality of high-potential gate voltage lines supplying a plurality of high-potential gate voltages having different voltage levels and a plurality of low-potential gate voltage lines supplying a plurality of low-potential gate voltages having different voltage levels.

For example, the gate voltage line 131 may include three high-potential gate voltage lines respectively supplying a first high-potential gate voltage GVDD1, a second high-potential gate voltage GVDD2, and a third high-potential gate voltage GVDD3 having different voltage levels and three low-potential gate voltage lines respectively supplying a first low-potential gate voltage GVSS1, a second low-potential gate voltage GVSS2, and a third low-potential gate voltage GVSS3 having different voltage levels. However, this is merely an example, and the number of lines included in the gate voltage line 131 may vary according to embodiments.

The clock signal line 132 supplies a plurality of clock signals CLKs supplied from the timing controller 140, e.g., a carry clock or a scan clock, to each of the first to kth stage circuits ST(1) to ST(k), the previous dummy stage circuit DST1, and the subsequent dummy stage circuit DST2.

The line sensing signal line 133 supplies the line sensing signal LSP supplied from the timing controller 140 to the first to kth stage circuits ST(1) to ST(k). Optionally, the line sensing signal line 133 may be additionally connected to the previous dummy stage circuit DST1.

The reset signal line 134 supplies the reset signal RESET supplied from the timing controller 140 to the first to kth stage circuits ST(1) to ST(k), the previous dummy stage circuit DST1, and the subsequent dummy stage circuit DST2.

The panel on signal line 135 supplies the panel on signal POS supplied from the timing controller 140 to the first to kth stage circuits ST(1) to ST(k), the previous dummy stage circuit DST1, and the subsequent dummy stage circuit DST2.

Further, lines for supplying other signals other than the lines 131, 132, 133, and 134 shown here may further be connected to the first to kth stage circuits ST(1) to ST(k), the previous dummy stage circuit DST1, and the subsequent dummy stage circuit DST2. For example, a line for supplying the gate start pulse GSP to the previous dummy stage circuit DST1 may be additionally connected to the previous dummy stage circuit DST1.

The previous dummy stage circuit DST1 outputs the previous carry signal Cd1 in response to the input of the gate start pulse GSP supplied from the timing controller 140.

The previous carry signal Cd1 may be supplied to any one of the first to kth stage circuits ST(1) to ST(k).

The subsequent dummy stage circuit DST2 outputs a subsequent carry signal Cd2. The subsequent carry signal Cd2 may be supplied to any one of the first to kth stage circuits ST(1) to ST(k).

The first to kth stage circuits ST(1) to ST(k) may be connected to each other stepwise or in a cascaded manner.

The first to kth stage circuits ST(1) to ST(k) each output j (j is a positive integer) scan signals SCAN and one carry signal C. In other words, any stage circuit outputs the first to jth scan signals and one carry signal C.

For example, each stage circuit outputs four scan signals SCAN and one carry signal C. For example, the first stage circuit ST(1) outputs a first scan signal SCAN(1), a second scan signal SCAN(2), a third scan signal SCAN(3), and a fourth scan signal (SCAN(4) and a first carry signal C(1), and the second stage circuit ST(2) outputs a fifth scan signal SCAN(5), a sixth scan signal SCAN(6), a seventh scan signal SCAN(7), and an eighth scan signal SCAN(8) and a second carry signal C(2). Thus, in the present embodiment, j is 4.

The number of scan signals output from the first to kth stage circuits ST(1) to ST(k) matches the number n of the gate lines 15 disposed on the display panel 10. As described above, each stage circuit outputs j scan signals. Therefore, the equation $j\times k=n$ is established.

For example, when $j=4$, the number k of the stage circuits is ¼ of the number n of the gate lines GL. However, the number of scan signals output by each stage circuit is not limited thereto. In other words, in the embodiment of the disclosure, each stage circuit may output one, two, or three scan signals or may output five or more scan signals. The number of stage circuits may vary according to the number of scan signals output by each stage circuit.

The scan signal SCAN output from the first to kth stage circuits ST(1) to ST(k) may be a scan signal for sensing the threshold voltage of the driving transistor DRT and may be a gate signal for displaying an image. The carry signals C output from the first to kth stage circuits ST(1) to ST(k) may be supplied to different stage circuits, respectively. The carry signal supplied from the previous stage circuit to any stage circuit is referred to as a previous stage carry signal, and the carry signal supplied from the subsequent stage circuit is referred to as a subsequent carry signal.

Figure 7:
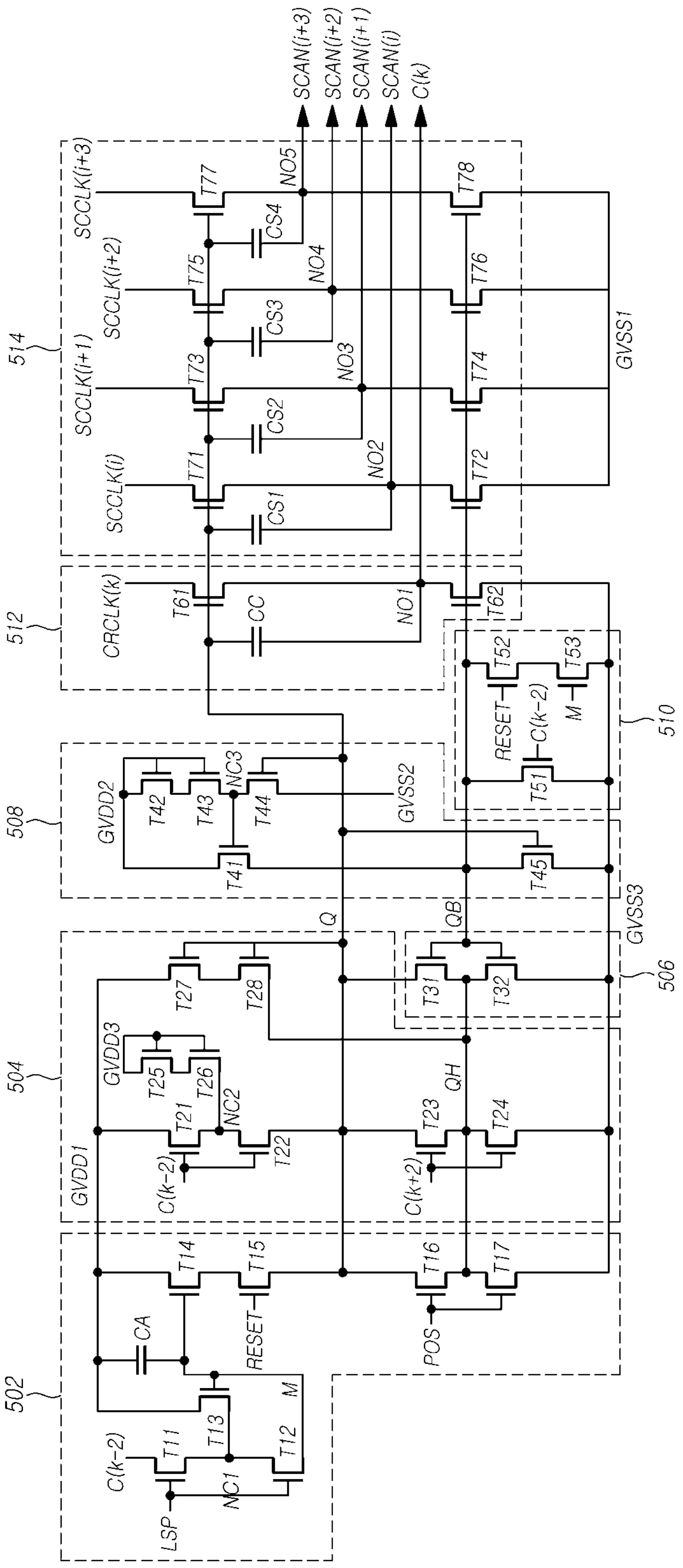
FIG. 7 is a view illustrating a gate driving integrated circuit constituting a gate driving circuit in a display driving circuit according to embodiments of the disclosure.

FIG. 7 is a view illustrating a stage circuit constituting a gate driving circuit in a display driving circuit according to embodiments of the disclosure.

Referring to FIG. 7, the stage circuit according to embodiments of the disclosure may include an M node, a Q node, and a QB node, and may include a line selection unit 502, a Q node control unit 504, a Q node stabilization unit 506, an inverter unit 508, a QB node stabilization unit 510, a carry signal output unit 512, and a scan signal output unit 514.

The line selection unit 502 charges the M node based on the carry signal C(k−2) of the previous stage in response to the input of the line sensing signal LSP. In response to the input of the reset signal RESET, the line selection unit 502 charges the Q node to the level of the first high-potential gate voltage GVDD1 based on the charging voltage of the M node. The line selection unit 502 discharges or resets the Q node to the level of the third low-potential gate voltage GVSS3 in response to the input of the panel-on signal POS.

The line selection unit 502 includes 11th to 17th transistors T11 to T17 and a precharging capacitor CA.

The 11th transistor T11 and the 12th transistor T12 are connected between the first high-potential gate voltage line transferring the first high-potential gate voltage GVDD1 and the M node. The 11th transistor T11 and the 12th transistor T12 are connected in series with each other.

The 11th transistor T11 outputs the previous carry signal C(k−2) to the first connection node NC1 in response to the input of the line sensing signal LSP.

The 12th transistor T12 electrically connects the first connection node NC1 to the M node in response to the input of the line sensing signal LSP. For example, as the line sensing signal LSP of high voltage is input to the 11th transistor T11 and the 12th transistor T12, the 11th transistor T11 and the 12th transistor T12 are simultaneously turned on so that the M node is charged to the level of the first high-potential gate voltage GVDD1.

The 13th transistor T13 is turned on when the voltage level of the M node is the high level, supplying the first high-potential gate voltage GVDD1 to the first connection node NC1. When the first high-potential gate voltage GVDD1 is supplied to the first connection node NC1, a voltage difference between the gate voltage of the 11th transistor T11 and the first connection node NC1 increases.

Accordingly, when the low-level line sensing signal LSP is input to the gate node of the 11th transistor T11 so that the 11th transistor T11 is turned off, the 11th transistor T11 may remain in the fully turned-off state due to the voltage difference between the gate voltage of the 11th transistor T11 and the first connection node NC1. Accordingly, current leakage of the 11th transistor T11 and the voltage drop of the M node may be prevented, so that the voltage of the M node may remain stable.

The precharging capacitor CA is connected between the first high-potential gate voltage line transferring the first high-potential gate voltage GVDD1 and the M node, storing the difference between the first high-potential gate voltage GVDD1 and the voltage charged in the M node.

If the 11th transistor T11, the 12th transistor T12, and the 13th transistor T13 are turned on, the precharging capacitor CA stores the high voltage of the previous carry signal C(k−2). If the 11th transistor T11, the 12th transistor T12, and the 13th transistor T13 are turned off, the precharging capacitor CA maintains the voltage of the M node as the stored voltage for a predetermined time.

The 14th transistor T14 and the 15th transistor T15 are connected between the first high-potential gate voltage line that transfers the first high-potential gate voltage GVDD1 and the Q node. The 14th transistor T14 and the 15th transistor T15 are connected in series with each other.

The 14th transistor T14 and the 15th transistor T15 charge the Q node with the first high-potential gate voltage GVDD1 in response to the M node voltage and the input of the reset signal RESET.

The 14th transistor T14 is turned on when the voltage of the M node is at a high level to transfer the first high-potential gate voltage GVDD1 to the shared node of the 14th transistor T14 and the 15th transistor T15.

The 15th transistor T15 is turned on by the high-level reset signal RESET to supply the voltage of the shared node to the Q node. Accordingly, if the 14th transistor T14 and the 15th transistor T15 are simultaneously turned on, the Q node is charged with the first high-potential gate voltage GVDD1.

The 16th transistor T16 and the 17th transistor T17 are connected between the Q node and a third low-potential gate voltage line that transfers the third low-potential gate voltage GVSS3. The 16th transistor T16 and the 17th transistor T17 are connected in series with each other.

The 16th transistor T16 and the 17th transistor T17 discharge the Q node to the third low-potential gate voltage GVSS3 in response to the input of the panel-on signal POS. Discharging the Q node to the third low-potential gate voltage GVSS3 may be expressed as resetting the Q node.

The 17th transistor T17 is turned on by the input of the high-level panel-on signal POS to supply the third low-potential gate voltage GVSS3 to the QH node.

The 16th transistor T16 is turned on by the input of the high-level panel-on signal POS to electrically connect the Q node and the QH node. Accordingly, if the 16th transistor T16 and the 17th transistor T17 are simultaneously turned on, the Q node is discharged or reset to the third low-potential gate voltage GVSS3.

The Q node control unit 504 charges the Q node to the level of the first high-potential gate voltage GVDD1 in response to the input of the previous carry signal C(k−2) and discharges the Q node to the level of the third low-potential gate voltage GVSS3 in response to the input of the subsequent carry signal C(k+2).

The Q node control unit 504 includes 21st to 28th transistors T21 to T28.

The 21st transistor T21 and the 22nd transistor T22 are connected between the first high-potential gate voltage line that transfers the first high-potential gate voltage GVDD1 and the Q node. The 21st transistor T21 and the 22nd transistor T22 are connected in series with each other.

The 21st transistor T21 and the 22nd transistor T22 charge the Q node to the first high-potential gate voltage GVDD1 level in response to the input of the previous carry signal C(k−2).

The 21st transistor T21 is turned on by the input of the previous carry signal C(k−2) to supply the first high-potential gate voltage GVDD1 to the second connection node NC2.

The 22nd transistor T22 is turned on by the input of the previous carry signal C(k−2) to electrically connect the second connection node NC2 and the Q node. Accordingly, if the 21st transistor T21 and the 22nd transistor T22 are simultaneously turned on, the first high-potential gate voltage GVDD1 is supplied to the Q node.

The 25th transistor T25 and the 26th transistor T26 are connected to the third high-potential gate voltage line which transfers the third high-potential gate voltage GVDD3. The 25th transistor T25 and the 26th transistor T26 supply the third high-potential gate voltage GVDD3 to the second connection node NC2 in response to the third high-potential gate voltage GVDD3.

The 25th transistor T25 and the 26th transistor T26 are simultaneously turned on by the third high-potential gate voltage GVDD3 to always supply the third high-potential gate voltage GVDD3 to the second connection node NC2, thereby increasing the voltage difference between the gate voltage of the 21st transistor T21 and the second connection node NC2. Accordingly, when the low-level previous carry signal C(k−2) is input to the gate node of the 21st transistor T21 so that the 21st transistor T21 is turned off, the 21st transistor T21 may remain in the fully turned-off state due to the voltage difference between the gate voltage of the 21st transistor T21 and the second connection node NC2.

Accordingly, current leakage of the 21st transistor T21 and resultant voltage drop of the Q node may be prevented, so that the voltage of the Q node may remain stable.

For example, when the threshold voltage of the 21st transistor T21 is negative (−), the gate-source voltage Vgs of the 21st transistor T21 remains negative (−) due to the third high-potential gate voltage GVDD3 supplied to the drain electrode.

Accordingly, when the low-level previous carry signal C(k−2) is input to the gate node of the 21st transistor T21 so that the 21st transistor T21 is turned off, the 21st transistor T21 maintains the fully turned-off state, preventing leakage current.

The third high-potential gate voltage GVDD3 is set to a voltage level lower than the first high-potential gate voltage GVDD1.

The 23rd transistor T23 and the 24th transistor T24 are connected between the Q node and a third low-potential gate voltage line that transfers the third low-potential gate voltage GVSS3. The 23rd transistor T23 and the 24th transistor T24 are connected in series with each other.

The 23rd transistor T23 and the 24th transistor T24 discharge the Q node and the QH node to the third low-potential gate voltage GVSS3 level in response to the input of the subsequent carry signal C(k+2).

The 24th transistor T24 is turned on according to the input of the subsequent carry signal C(k+2) to discharge the QH node to the third low-potential gate voltage GVSS3 level. The 23rd transistor T23 is turned on according to the input of the subsequent carry signal C(k+2) to electrically connect the Q node and the QH node. Accordingly, if the 23rd transistor T23 and the 24th transistor T24 are simultaneously turned on, the Q node and the QH node each are discharged or reset to the level of the third low-potential gate voltage GVSS3.

The 27th transistor T27 and the 28th transistor T28 are connected between the first high-potential gate voltage line that transfers the first high-potential gate voltage GVDD1 and the Q node and between the first high-potential gate voltage line that transfers the first high-potential gate voltage GVDD1 and the QH node. The 27th transistor T27 and the 28th transistor T28 are connected in series with each other.

The 27th transistor T27 and the 28th transistor T28 supply the first high-potential gate voltage GVDD1 to the QH node in response to the voltage of the Q node. The 27th transistor T27 is turned on when the voltage of the Q node is at a high level to supply the first high-potential gate voltage GVDD1 to the shared node of the 27th transistor T27 and the 28th transistor T28.

The 28th transistor T28 is turned on when the voltage of the Q node is at a high level to electrically connect the shared node and the QH node. Accordingly, the 27th transistor T27 and the 28th transistor T28 are simultaneously turned on when the voltage of the Q node is at a high level to supply the first high-potential gate voltage GVDD1 to the QH node.

If the first high-potential gate voltage GVDD1 is supplied to the QH node, a voltage difference between the gate node of the 23th transistor T23 and the QH node increases. Accordingly, when the low-level subsequent carry signal C(k+2) is input to the gate node of the 23th transistor T23 so that the 23th transistor T23 is turned off, the 23th transistor T23 may remain in the fully turned-off state due to the voltage difference between the gate voltage of the 23th transistor T23 and the QH node. Accordingly, current leakage of the 23th transistor T23 and resultant voltage drop of the Q node may be prevented, so that the voltage of the Q node may remain stable.

The Q node stabilization unit 506 discharges the Q node and the QH node to the level of the third low-potential gate voltage GVSS3 in response to the voltage of the QB node. The Q node stabilization unit 506 may include a 31st transistor T31 and a 32nd transistor T32. The 31st transistor T31 and the 32nd transistor T32 are connected between the Q node and a third low-potential gate voltage line that transfers the third low-potential gate voltage GVSS3. The 31st transistor T31 and the 32nd transistor T32 are connected in series with each other.

The 31st transistor T31 and the 32nd transistor T32 discharge the Q node and the QH node to the level of the third low-potential gate voltage GVSS3 in response to the voltage of the QB node. The 32nd transistor T32 is turned on when the voltage of the QB node is at a high level to supply the third low-potential gate voltage GVSS3 to the shared node of the 31st transistor T31 and the 32nd transistor T32.

The 31st transistor T31 is turned on when the voltage of the QB node is at a high level to electrically connect the Q node and the QH node. Accordingly, if the 31st transistor T31 and the 32nd transistor T32 are simultaneously turned on in response to the voltage of the QB node, the Q node and the QH node each are discharged or reset to the level of the third low-potential gate voltage GVSS3.

The inverter unit 508 changes the voltage level of the QB node according to the voltage level of the Q node. The inverter unit 508 includes 41st to 45th transistors T41 to T45.

The 42nd transistor T42 and the 43rd transistor T43 are connected between the second high-potential gate voltage line that transfers the second high-potential gate voltage GVDD2 and the third connection node NC3. The 42nd transistor T42 and the 43rd transistor T43 are connected in series with each other.

The 42nd transistor T42 and the 43rd transistor T43 supply the third high-potential gate voltage GVDD3 to the second connection node NC2 in response to the third high-potential gate voltage GVDD3. The 42nd transistor T42 is turned on by the second high-potential gate voltage GVDD2 to supply the second high-potential gate voltage GVDD2 to the shared node of the 42nd transistor T42 and the 43rd transistor T43.

The 43rd transistor T43 is turned on by the second high-potential gate voltage GVDD2 to electrically connect the shared node of the 42nd transistor T42 and the 43rd transistor T43 with the third connection node NC3. Accordingly, if the 42nd transistor T42 and the 43rd transistor T43 are simultaneously turned on by the second high-potential gate voltage GVDD2, the third connection node NC3 is charged to the level of the second high-potential gate voltage GVDD2.

The 44th transistor T44 is connected between the third connection node NC3 and the second low-potential gate voltage line that transfers the second low-potential gate voltage GVSS2.

The 44th transistor T44 supplies the second low-potential gate voltage GVSS2 to the third connection node NC3 in response to the voltage of the Q node. The 44th transistor T44 is turned on when the voltage of the Q node is at a high level to discharge or reset the third connection node NC3 to the second low-potential gate voltage GVSS2.

The 41st transistor T41 is connected between the second high-potential gate voltage line transferring the second high-potential gate voltage GVDD2 and the QB node.

The 41st transistor T41 supplies the second high-potential gate voltage GVDD2 to the QB node in response to the voltage of the third connection node NC3. The 41st transistor T41 is turned on when the voltage of the third connection node NC3 is at the high level to charge the QB node to the level of the second high-potential gate voltage GVDD2.

The 45th transistor T45 is connected between the QB node and the third low-potential gate voltage line that transfers the third low-potential gate voltage GVSS3.

The 45th transistor T45 supplies the third low-potential voltage GVSS3 to the QB node in response to the voltage of the Q node. The 45th transistor T45 is turned on when the voltage of the Q node is at the high level to discharge or reset the QB node to the third low-potential gate voltage GVSS3 level.

The QB node stabilization unit 510 discharges the QB node to the third low-potential gate voltage GVSS3 in response to the input of the subsequent carry signal C(k−2), the input of the reset signal RESET, and the charging voltage of the M node. The QB node stabilization unit 510 may include 51st to 53rd transistors T51 to T53.

The 51st transistor T51 is connected between the QB node and the third low-potential gate voltage line that transfers the third low-potential gate voltage GVSS3.

The 51st transistor T51 supplies the third low-potential gate voltage GVSS3 to the QB node in response to the input of the subsequent carry signal C(k−2).

The 52nd transistor T52 and the 53rd transistor T53 are connected between the QB node and the third low-potential gate voltage line that transfers the third low-potential gate voltage GVSS3. The 52nd transistor T52 and the 53rd transistor T53 are connected in series with each other.

The 52nd transistor T52 and the 53rd transistor T53 discharge the QB node to the third low-potential gate voltage GVSS3 level in response to the input of the reset signal RESET and the charging voltage of the M node.

The 53rd transistor T53 is turned on when the voltage at the M node is at a high level to supply the third low-potential gate voltage GVSS3 to the shared node of the 52nd transistor T52 and the 53rd transistor T53.

The 52nd transistor T52 is turned on by the input of the reset signal RESET to electrically connect the shared node of the 52nd transistor T52 and the 53rd transistor T53 with the QB node. Accordingly, if the reset signal RESET is input while the voltage of the M node is at a high level, the 52nd transistor T52 and the 53rd transistor T53 are simultaneously turned on to discharge or reset the QB node to the third low-potential gate voltage GVSS2 level.

The carry signal output unit 512 outputs the carry signal C(k) based on the voltage level of the carry clock CRCLK(k) or the third low-potential gate voltage GVSS3 level according to the voltage level of the Q node or the voltage level of the QB node.

The carry signal output unit 512 includes a 61st transistor T61, a 62nd transistor T62, and a boosting capacitor CC.

The 61st transistor T61 is connected between the clock line through which the carry clock CRCLK(k) is transferred and the first output node NO1. The boosting capacitor CC is connected between the gate node and the source node of the 61st transistor T61.

The 61st transistor T61 outputs a high-level carry signal C(k) through the first output node NO1 based on the carry clock CRCLK(k) in response to the voltage of the Q node. The 61st transistor T61 is turned on when the voltage of the Q node is at the high level to supply the carry clock CRCLK(k) of the high level to the first output node NO1. Accordingly, a high-level carry signal C(k) is output.

When the carry signal C(k) is output, the boosting capacitor CC bootstraps the voltage of the Q node to a higher boosting voltage level than the first high-potential gate voltage GVDD1 in synchronization with the high-level carry clock CRCLK(k). If the voltage of the Q node is bootstrapped, the high-level carry clock CRCLK(k) may be output as the carry signal C(k) quickly and without distortion.

The 62nd transistor T62 is connected between the first output node NO1 and the third low-potential gate voltage line that transfers the third low-potential gate voltage GVSS3.

The 62nd transistor T62 outputs a low-level carry signal C(k) through the first output node NO1 based on the third low-potential gate voltage GVSS3 in response to the voltage of the QB node. The 62nd transistor T62 is turned on when the voltage of the QB node is at a high level to supply the third low-potential voltage GVSS3 to the first output node NO1. Accordingly, a low-level carry signal C(k) is output.

The scan signal output unit 514 outputs a plurality of scan signals SCAN(i), SCAN(i+1), SCAN(i+2), and SCAN(i+3) based on the first low-potential gate voltage GVSS1 level or the voltage level of the plurality of scan clock signals SCCLK(i), SCCLK(i+1), SCCLK(i+2), and SCCLK(i+3) according to the voltage level of the Q node or the voltage level of the QB node. (where i is a positive integer)

Here, the plurality of scan clocks SCCLK(i), SCCLK(i+1), SCCLK(i+2), and SCCLK(i+3) are signals corresponding to the gate clock GCLK, and may vary depending on the number of scan signals SCAN(i), SCAN(i+1), SCAN(i+2), and SCAN(i+3) output from the gate driving integrated circuit GDIC.

The scan signal output unit 514 includes 71st to 78th transistors T71 to T78 and boosting capacitors CS1, CS2, CS3, and CS4.

The 71st transistor T71, the 73rd transistor T73, the 75th transistor T75, and the 77th transistor T77 are connected between the clock lines transferring the scan clocks SCCLK(i), SCCLK(i+1), SCCLK(i+2), and SCCLK(i+3) and the second to fifth output nodes NO2 to NO5.

The boosting capacitors CS1, CS2, CS3, and CS4 are connected between the gate nodes and the source nodes of the 71st transistor T71, the 73rd transistor T73, the 75th transistor T75, and the 77th transistor T77.

The 71st transistor T71, the 73rd transistor T73, the 75th transistor T75, and the 77th transistor T77, respectively, output the high-level scan signals SCAN(i), SCAN(i+1), SCAN(i+2), and SCAN(i+3) through the second output node NO2, the third output node NO3, the fourth output node NO4, and the fifth output node NO5 based on the scan clocks SCCLK(i), SCCLK(i+1), SCCLK(i+2), and SCCLK(i+3) in response to the voltage of the Q node.

The 71st transistor T71, the 73rd transistor T73, the 75th transistor T75, and the 77th transistor T77 are turned on when the voltage of the Q node is at a high level, supplying the high-level scan clocks SCCLK(i), SCCLK(i+1), SCCLK (i+2), and SCCLK(i+3) to the second output node NO2, the third output node NO3, the fourth output node NO4, and the fifth output node NO5, respectively. Accordingly, the high-level scan signals SCAN(i), SCAN(i+1), SCAN(i+2), and SCAN(i+3) each are output.

The 71st transistor T71, the 73rd transistor T73, the 75th transistor T75, and the 77th transistor T77 each correspond to pull-up transistors.

When the scan signals SCAN(i), SCAN(i+1), SCAN(i+2), and SCAN(i+3) are output, the boosting capacitors CS1, CS2, CS3, and CS4 bootstrap or increase the voltage of the Q node to a higher boosting voltage level than the first high-potential gate voltage GVDD1 level in synchronization with the high-level scan clocks SCCLK(i), SCCLK(i+1), SCCLK(i+2), and SCCLK(i+3). When the voltage of the Q node is bootstrapped, the high-level scan clocks SCCLK(i), SCCLK(i+1), SCCLK(i+2), and SCCLK(i+3) may be output as scan signals SCAN(i), SCAN(i+1), SCAN(i+2), and SCAN(i+3) quickly and without distortion.

The 72nd transistor T72, 74th transistor T74, 76th transistor T76, and 78th transistor T78, respectively, output the low-level scan signals SCAN(i), SCAN(i+1), SCAN(i+2), and SCAN(i+3) through the second output node NO2, the third output node NO3, the fourth output node NO4, and the fifth output node NO5 based on the first low-potential gate voltage GVSS1 in response to the voltage of the QB node.

The 72nd transistor T72, the 74th transistor T74, the 76th transistor T76, and the 78th transistor T78 are turned on when the voltage of the QB node is at a high level to supply the first low-potential gate voltage GVSS1 to the second output node NO2, the third output node NO3, the fourth output node NO4, and the fifth output node NO5, respectively. Accordingly, the low-level scan signals SCAN(i), SCAN(i+1), SCAN(i+2), and SCAN(i+3) are output.

The 72nd transistor T72, the 74th transistor T74, the 76th transistor T76, and the 78th transistor T78 respectively correspond to pull-down transistors.

Described herein is an example in which three high-potential gate voltages GVDD1, GVDD2, and GVDD3 set to different levels and three low-potential gate voltages GVSS1, GVSS2, and GVSS3 set to different levels are supplied to each stage circuit. For example, the first high-potential gate voltage GVDD1 may be set to 20V, the second high-potential gate voltage GVDD2 may be set to 16V, the third high-potential gate voltage GVDD3 may be set to 14V, the first low-potential gate voltage GVSS1 may be set to −6V, the second low-potential gate voltage GVSS2 may be set to −10V, and the third low-potential gate voltage GVSS3 may be set to −12V. These values are merely examples, and the levels of the high-potential gate voltages and the low-potential gate voltages may be set to differ depending on embodiments.

Since the gate driving integrated circuit GDIC includes a plurality of transistors, the degradation and lifespan of the gate driving integrated circuit GDIC may be determined by the most degraded transistor among them.

In general, in the gate driving integrated circuit GDIC, the stabilization of the Q node plays an important role, and therefore, it may be said that the stress applied to the transistors T31 and T32 constituting the Q node stabilization unit 506 and the pull-down transistors T72, T74, T76, and T78 constituting the scan signal output unit 514 is relatively large.

Figure 8:
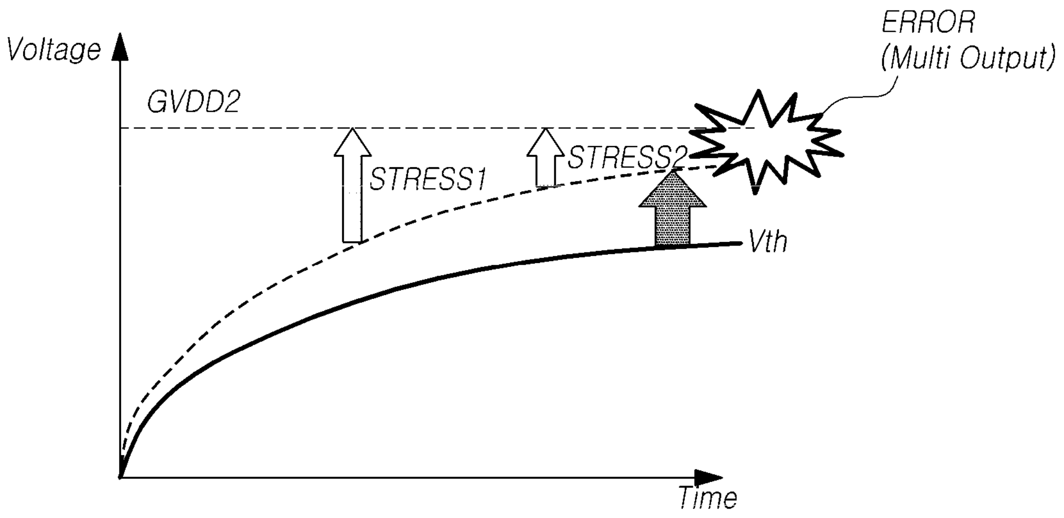
FIG. 8 is a view schematically illustrating an occurrence of an error and deterioration of a gate driving circuit according to the driving time in a display device according to embodiments of the disclosure.

FIG. 8 is a view schematically illustrating an occurrence of an error and deterioration of a gate driving circuit according to the driving time in a display device according to embodiments of the disclosure.

Referring to FIG. 8, in the display device 100 according to embodiments of the disclosure, as the driving time increases, the transistor constituting the gate driving integrated circuit GDIC may be deteriorated, and the threshold voltage Vth may increase.

In particular, the transistors T31 and T32 constituting the Q node stabilization unit 506 and the pull-down transistors T72, T74, T76, and T78 constituting the scan signal output unit 514 have their gate terminals connected to the QB node, and thus directly affect the deterioration of the gate driving integrated circuit GDIC.

Among them, the voltage corresponding to the difference between the high-potential gate voltage GVDD2 and the threshold voltage Vth acts as a stress in the transistors T31 and T32 constituting the Q node stabilization unit 506.

Accordingly, when the second high-potential gate voltage GVDD2 applied to the gate driving integrated circuit GDIC is maintained at a constant level, the difference between the second high-potential gate voltage GVDD2 and the threshold voltage Vth increases during the initial driving period of the display device 100. Accordingly, during the initial driving period of the display device 100, the stress applied to the transistors T31 and T32 constituting the Q node stabilization unit 506 is high (STRESS1).

However, as the driving period of the display device 100 increases, the threshold voltage Vth of the transistors T31 and T32 constituting the Q node stabilization unit 506 increases, and thus the difference between the second high-potential gate voltage GVDD2 and the threshold voltage Vth gradually decreases (STRESS2).

Accordingly, as the driving period of the display device 100 increases, the stress of the transistors T31 and T32 constituting the Q node stabilization unit 506 gradually decreases.

However, as the driving time is further increased, when the second high-potential gate voltage GVDD2 and the threshold voltage Vth of the transistors T31 and T32 constituting the Q node stabilization unit 506 are reduced within a predetermined range, a multi-output error may occur in which a scan signal is generated in an arbitrary gate line due to an operation error of the transistors T31 and T32 constituting the Q node stabilization unit 506.

Figure 9:
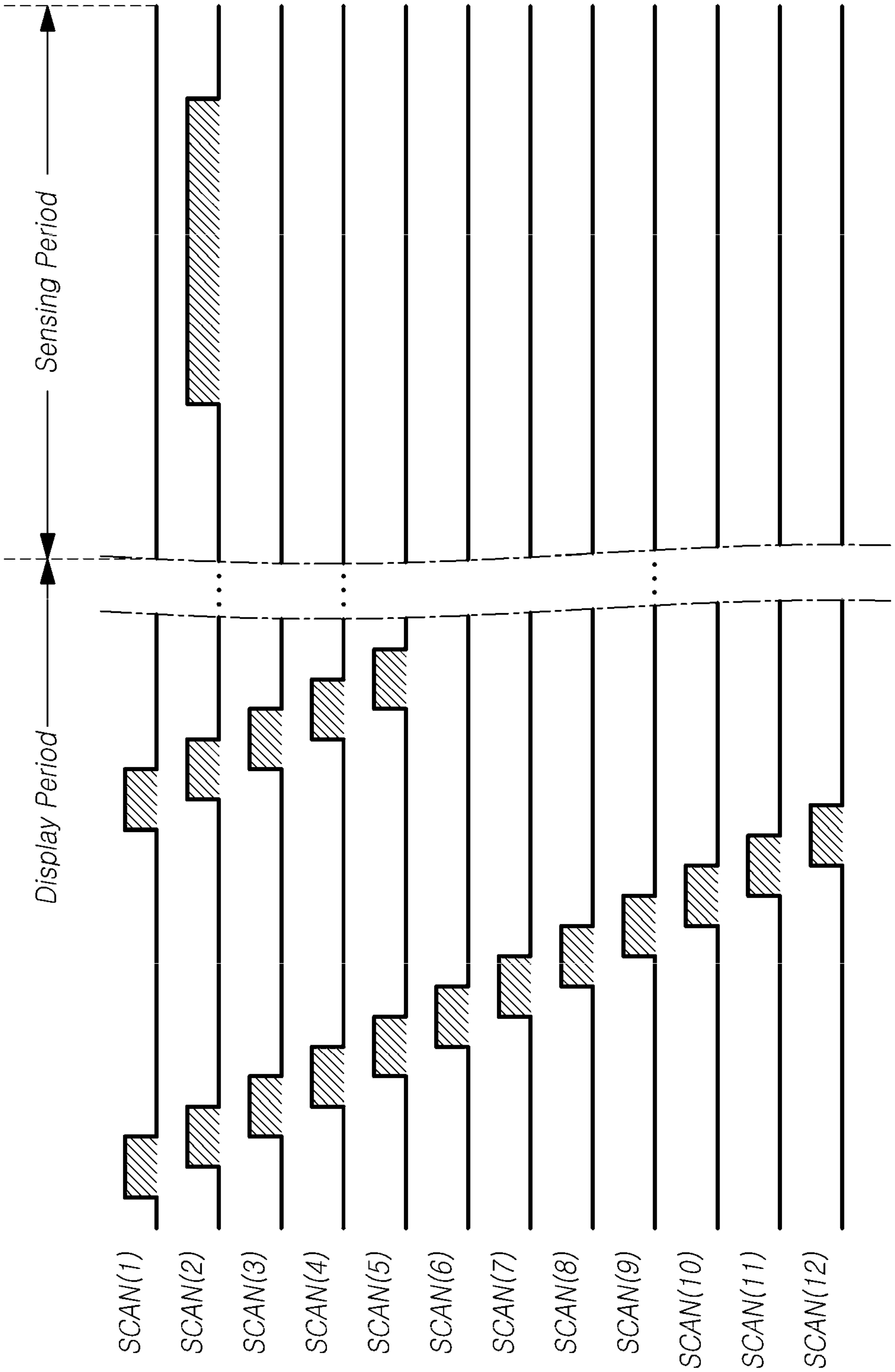
FIG. 9 is a view illustrating a waveform of a scan signal output from a gate driving circuit during a display period and a sensing period in a display device according to embodiments of the disclosure.
Figure 10:
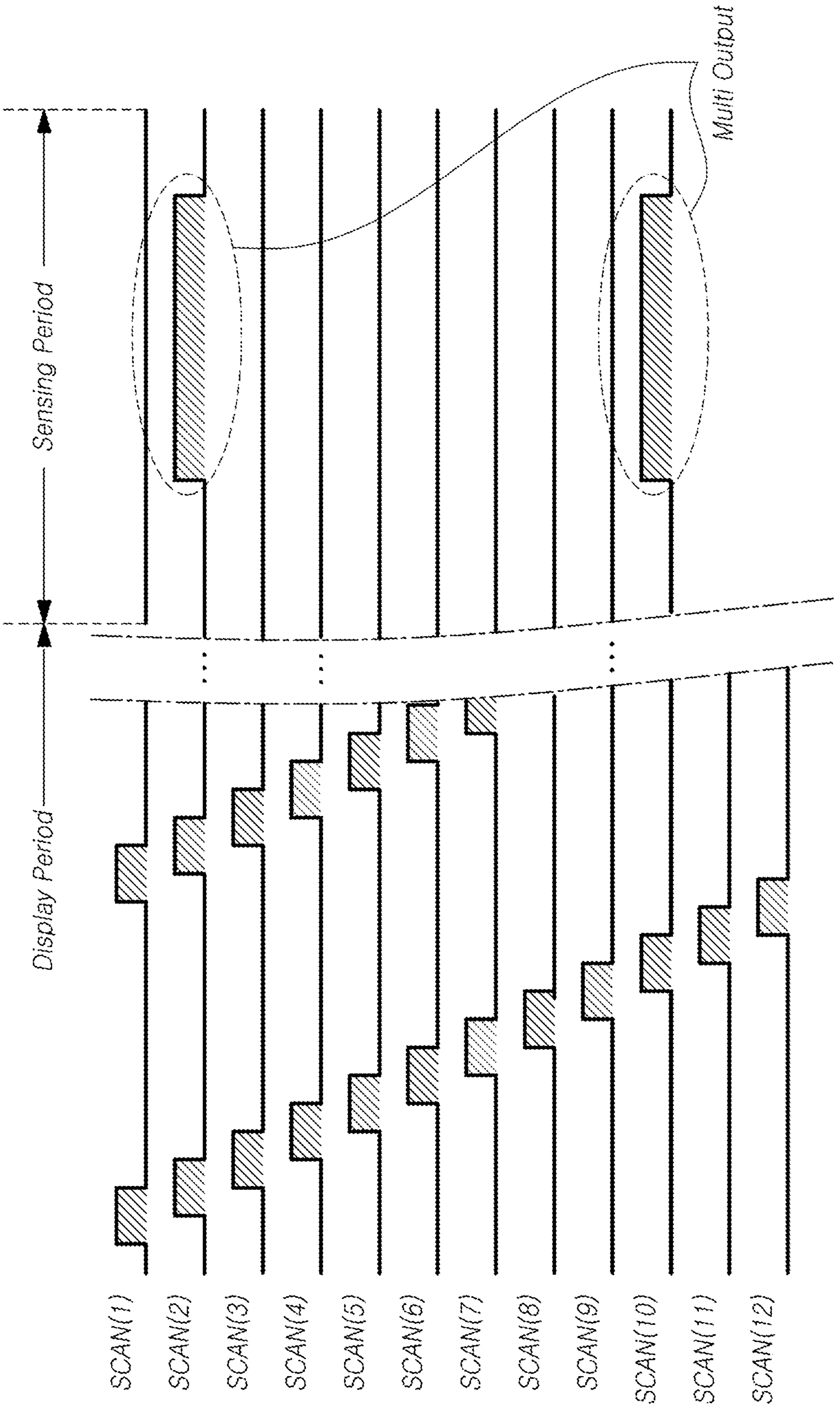
FIG. 10 is a signal waveform diagram illustrating a case where a multi-output error occurs in which a scan signal is generated on an arbitrary gate line due to deterioration of a gate driving integrated circuit.

FIG. 9 is a waveform diagram illustrating a scan signal output from a gate driving circuit during a display period and a sensing period in a display device according to embodiments of the disclosure, and FIG. 10 is a signal waveform diagram illustrating a case in which a multi-output error occurs in which a scan signal is generated in an arbitrary gate line occurs due to deterioration of the gate driving integrated circuit.

First, referring to FIG. 9, the display device 100 according to embodiments of the disclosure may emit light through the subpixel SP disposed on the display panel 110 during a display driving period, and detect a characteristic value of the driving transistor disposed in an arbitrary subpixel SP during a sensing period. In this case, the sensing period may correspond to a blank period in which the display panel 110 does not emit light.

In the case of a 12-phase scan clock structure in which 12 scan clocks are sequentially supplied, 12 scan clocks having different phases may be sequentially applied to the gate driving circuit 120 through 12 scan clock lines. In this case, each of the 12 scan clocks may correspond to 12 scan signals SCAN(1)-SCAN(12).

Accordingly, during the display driving period, the gate driving circuit 120 supplies 12 scan signals SCAN(1)-SCAN(12) to the display panel 110 at regular phase intervals.

Meanwhile, during the sensing period, the characteristic value of the subpixel connected to the corresponding line is detected by applying the scan signal (here, the second scan signal SCAN 2) only to the designated gate line.

However, as illustrated in FIG. 10, when the second high-potential gate voltage GVDD2 and the threshold voltage Vth of the transistors T31 and T32 constituting the Q node stabilization unit 506 decrease within a predetermined range as the driving time of the display device 100 increases, a multi-output error in which a plurality of scan signals are supplied to an arbitrary gate line may occur due to an operation error of the transistors T31 and T32 constituting the Q node stabilization unit 506.

For example, due to deterioration of the gate driving integrated circuit GDIC in the 12-phase scan clock structure, a multi-output error in which the second scan signal SCAN 2 and the 10th scan signal SCAN 10 are simultaneously output may occur.

Accordingly, the display device 100 according to the disclosure may control the gate voltage applied to the gate driving circuit 120 in consideration of a case where a multi-output error occurs in the gate driving circuit 120, thereby reducing deterioration of the gate driving circuit 120 and enhancing operational performance.

In this case, it is effective that the gate voltage for reducing the deterioration of the gate driving circuit 120 and enhancing the operation performance targets the second high-potential gate voltage GVDD2 corresponding to the driving voltage of the transistors T41, T42, T43, and T44 constituting the inverter unit 508 so as to relieve stress of the transistors T31 and T32 constituting the Q node stabilization unit 506 in the gate driving integrated circuit.

Figure 11:
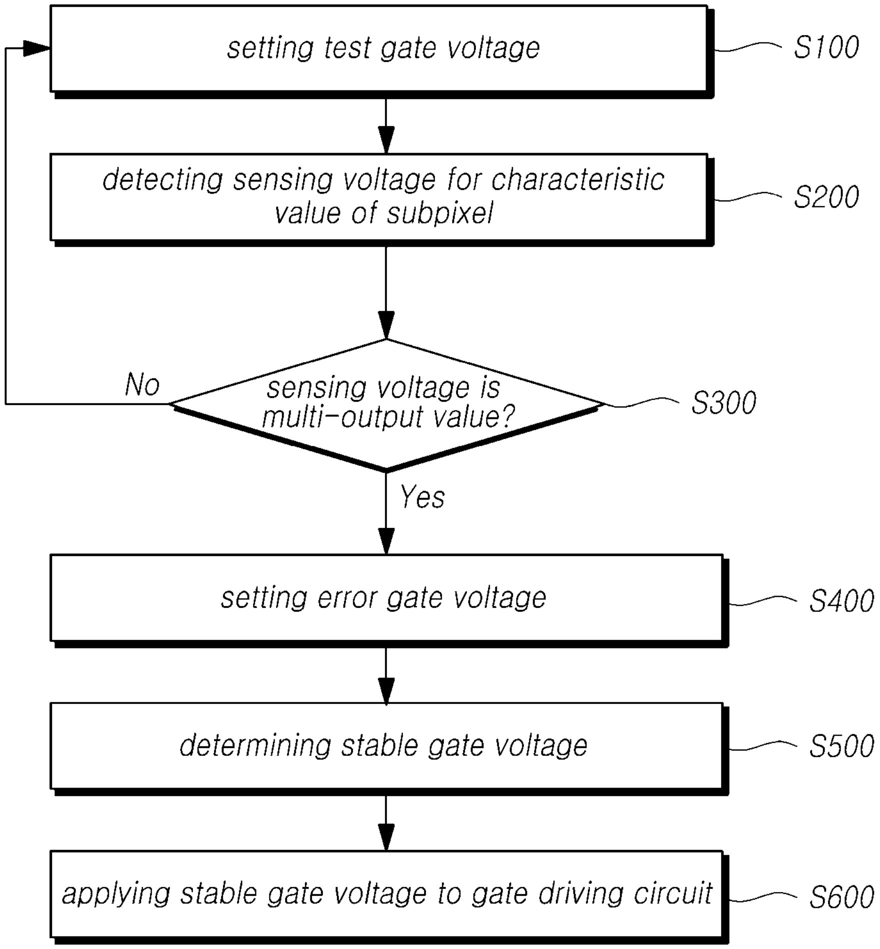
FIG. 11 is a flowchart illustrating a display driving method according to embodiments of the disclosure.

FIG. 11 is a flowchart illustrating a display driving method according to embodiments of the disclosure.

Referring to FIG. 11, a display driving method according to embodiments of the disclosure may include a step S100 of setting a test gate voltage, a step S200 of detecting a sensing voltage for a characteristic value of a subpixel SP, a step S300 of determining whether the sensing voltage corresponds to a multi-output value, a step S400 of setting an error gate voltage when the sensing voltage corresponds to the multi-output value, a step S500 of determining a stable gate voltage, and a step S600 of applying the stable gate voltage to the gate driving circuit 120.

The step S100 of setting the test gate voltage is a process of setting a test gate voltage to be applied to the gate driving circuit 120 in order to identify a deterioration state of the gate driving circuit 120 during a sensing period of detecting a characteristic value (threshold voltage or mobility) of the subpixel SP.

The test gate voltage may correspond to the second high-potential gate voltage GVDD2 applied to the inverter 508 of the gate driving integrated circuit GDIC.

The test gate voltage may have a value that decreases in a predetermined level unit from the initial set voltage so that the deterioration state of the gate driving circuit 120 may be identified. For example, the initial set voltage of the test gate voltage may be set to 6V, and the deterioration state of the gate driving circuit 120 may be identified while decreasing by 1V.

The step S200 of detecting the sensing voltage for the characteristic value of the subpixel SP is a process of detecting the sensing voltage corresponding to the characteristic value of the driving transistor DRT according to the scan signal of the gate driving circuit 120 driven by the test gate voltage during the sensing period.

Figure 12:
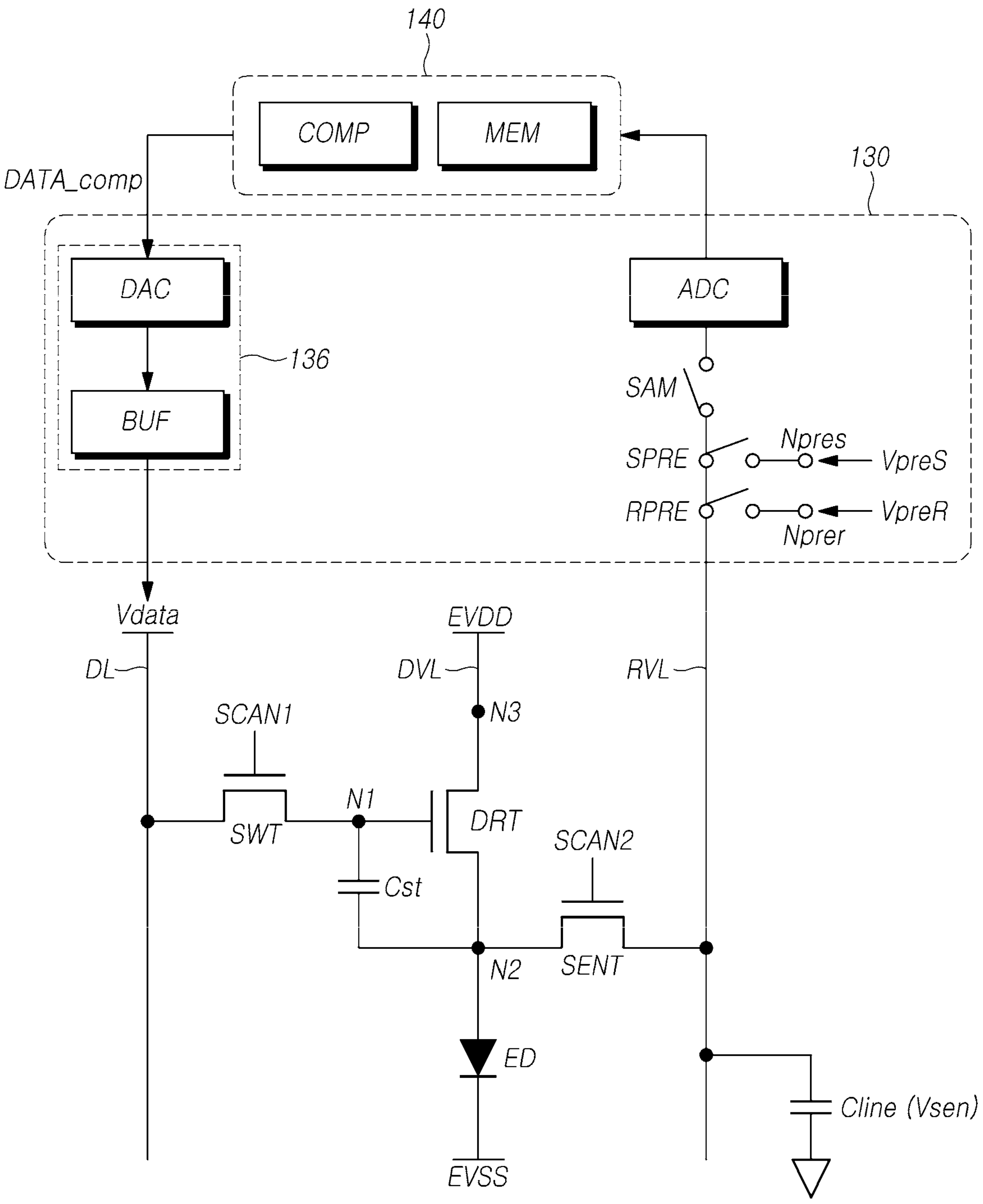
FIG. 12 is a view illustrating an example circuit of sensing a characteristic value of a driving transistor in a display device according to embodiments of the disclosure.

FIG. 12 is a view illustrating an example circuit of sensing a characteristic value of a driving transistor in a display device according to embodiments of the disclosure.

Referring to FIG. 12, a display device 100 according to embodiments of the disclosure may include components for compensating for a deviation in the characteristic value of the driving transistor DRT.

For example, the characteristic value, or a change therein, of the driving transistor DRT may be reflected as the voltage (e.g., Vdata-Vth) of the second node N2 of the driving transistor DRT. The voltage of the second node N2 of the driving transistor DRT may correspond to the voltage of the reference voltage line RVL when the sensing transistor SENT is in the turned-on state. Further, the line capacitor Cline of the reference voltage line RVL may be charged by the voltage of the second node N2 of the driving transistor DRT, and the reference voltage line RVL may have a voltage corresponding to the voltage of the second node N2 of the driving transistor DRT based on the sensing voltage Vsen charged to the line capacitor Cline.

The display device 100 may include an analog-to-digital converter ADC for measuring the voltage of the reference voltage line RVL corresponding to the voltage of the second node N2 of the driving transistor DRT and converting the voltage into a digital value, and a switch circuit SAM, SPRE for sensing characteristic values.

The switch circuit SAM, SPRE for controlling the characteristic value sensing driving may include a sensing reference switch SPRE for controlling a connection between the reference voltage line RVL and the sensing reference voltage supply node Npres to which the reference voltage Vref is supplied, and a sampling switch SAM for controlling a connection between the reference voltage line RVL and the analog-to-digital converter ADC. Here, the sensing reference switch SPRE is a switch for controlling characteristic value sensing driving, and the reference voltage Vref supplied to the reference voltage line RVL by the sensing reference switch SPRE becomes the sensing reference voltage VpreS.

The switch circuit for sensing the characteristic value of the driving transistor DRT may include a display reference switch RPRE for controlling display driving. The display reference switch RPRE may control a connection between the reference voltage line RVL and the display reference voltage supply node Nprer to which the reference voltage Vref is supplied. The display reference switch RPRE is a switch used to drive the display, and the reference voltage Vref supplied to the reference voltage line RVL by the display reference switch RPRE corresponds to the display reference voltage VpreR.

In this case, the sensing reference switch SPRE and the display reference switch RPRE may be separately provided or may be integrated into one. The sensing reference voltage VpreS and the display reference voltage VpreR may have the same voltage value or different voltage values.

The timing controller 140 of the display device 100 may include a memory MEM for storing the data transferred from the analog-to-digital converter ADC or previously storing a reference value and a compensation circuit COMP that compares the reference value stored in the memory MEM and the received data and compensates for the deviation in characteristic value. In this case, the compensation value calculated by the compensation circuit COMP may be stored in the memory MEM.

Accordingly, the timing controller 140 may compensate for the image data DATA to be supplied to the data driving circuit 130 using the compensation value calculated by the compensation circuit COMP, and output the compensation image data DATA_comp to the data driving circuit 130. Accordingly, the data driving circuit 130 may convert the compensation image data DATA_comp into the compensation data voltage Vdata_comp in the form of an analog signal through the digital-to-analog converter DAC, and output the compensation data voltage Vdata_comp to the corresponding data line DL through the output buffer BUF. As a result, the deviation in characteristic value (e.g., deviation in threshold voltage deviation or deviation in mobility) for the driving transistor DRT in the corresponding subpixel SP may be compensated.

As described above, the period for sensing the characteristic values (threshold voltage and mobility) of the driving transistor DRT may be performed after the power-on signal is generated and before the display driving starts. For example, if a power-on signal is applied to the display device 100, the timing controller 140 loads parameters for driving the display panel 110 and then drives the display. In this case, the parameters for driving the display panel 110 may include information about the sensing and compensation for characteristic values previously performed on the display panel 110. In the parameter loading process, the sensing of characteristic values (threshold voltage and mobility) of the driving transistor DRT may be performed. As described above, a process in which characteristic value sensing is performed after the power-on signal is generated and before the subpixel emits light is referred to as an on-sensing process.

Alternatively, a period in which the characteristic value of the driving transistor DRT is sensed may proceed after a power-off signal of the display device 100 is generated. For example, when a power-off signal is generated in the display device 100, the timing controller 140 may cut off the data voltage supplied to the display panel 110 and may sense the characteristic value of the driving transistor DRT for a predetermined time. As such, a process in which sensing of the characteristic value is performed in a state in which the data voltage is cut off as a power-off signal is generated so that emission of the subpixel is terminated is referred to as an off-sensing process.

Further, the sensing period for the characteristic value of the driving transistor DRT may be performed in real time while the display is driven. This sensing process is referred to as a real-time (RT) sensing process. In the real-time sensing process, the sensing process may be performed on one or more subpixels SP in one or more subpixel SP lines, each blank period during the display driving period.

In other words, during the display driving period when an image is displayed on the display panel 110, a blank period in which the data voltage is not supplied to the subpixel SP exists within one frame or between the nth frame and the (n+1)th frame and, in the blank period, mobility sensing for one or more subpixels SP may be performed.

As such, when the sensing process is performed in the blank period, the subpixel (SP) line on which the sensing process is performed may be randomly selected. Also, after the sensing process is performed during the blank period, the compensation data voltage Vdata_comp may be supplied to the subpixel SP in which the sensing process is performed during the display driving period. Accordingly, an abnormality in the subpixel SP line in which the sensing process is completed during the display driving period after the sensing process in the blank period may be alleviated.

The data driving circuit 130 may include a data voltage output circuit 136 including a latch circuit, a digital-to-analog converter DAC, and an output buffer BUF and, in some cases, the data driving circuit 130 may further include an analog-to-digital converter ADC and various switches SAM, SPRE, and RPRE. Alternatively, the analog-to-digital converter ADC and various switches SAM, SPRE, and RPRE may be positioned outside the data driving circuit 130.

Further, the compensation circuit COMP may be present outside the timing controller 140 or may be included inside the timing controller 140, and the memory MEM may be positioned outside the timing controller 140 or may be implemented in the form of a register inside the timing controller 140.

Figure 13:
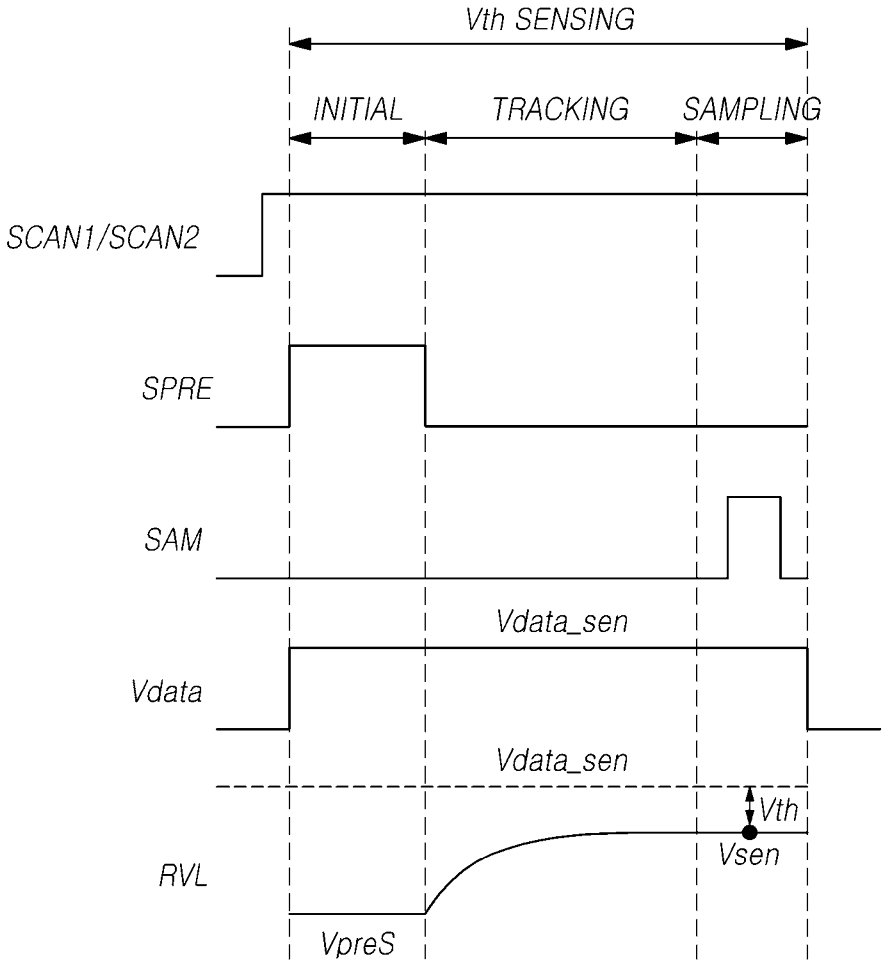
FIG. 13 is a view illustrating an example driving timing diagram for detecting a threshold voltage among characteristic values of a driving transistor in a display device according to embodiments of the disclosure.

FIG. 13 is a view illustrating an example driving timing diagram for detecting a threshold voltage among characteristic values of a driving transistor in a display device according to embodiments of the disclosure.

Referring to FIG. 13, in the display device 100 according to embodiments of the disclosure, the threshold voltage sensing period Vth SENSING may include an initialization period INITIAL, a tracking period TRACKING, and a sampling period SAMPLING.

In the initialization interval INITIAL, the switching transistor SWT is turned on by the first scan signal SCAN1 of the turn-on level. Accordingly, the first node N1 of the driving transistor DRT is initialized to the sensing data voltage Vdata_sen for threshold voltage sensing.

Further, the sensing transistor SENT is turned on and the sensing reference switch SPRE is turned on by the second scan signal SCAN2 of the turn-on level voltage in the initialization interval INITIAL. Accordingly, the second node N2 of the driving transistor DRT is initialized to the sensing reference voltage VpreS.

The tracking period TRACKING is a step of tracking the threshold voltage Vth of the driving transistor DRT. In other words, the tracking period TRACKING tracks the voltage of the second node N2 of the driving transistor DRT reflecting the threshold voltage Vth of the driving transistor DRT.

In the tracking period TRACKING, the switching transistor SWT and the sensing transistor SENT are maintained in the turned-on state, and the sensing reference switch SPRE is turned off. Accordingly, the second node N2 of the driving transistor DRT becomes a floating state, and the voltage of the second node N2 of the driving transistor DRT starts to rise from the sensing reference voltage VpreS.

In this case, since the sensing transistor SENT is in a turned-on state, an increase in voltage of the second node N2 of the driving transistor DRT leads to an increase in voltage of the reference voltage line RVL.

The voltage of the second node N2 of the driving transistor DRT rises and then becomes saturated. The voltage saturated at the second node N2 of the driving transistor DRT corresponds to a difference Vdata_sen−Vth between the sensing data voltage Vdata_sen for the threshold voltage and the threshold voltage Vth of the driving transistor DRT.

Accordingly, when the voltage of the second node N2 of the driving transistor DRT is saturated, the voltage of the reference voltage line RVL corresponds to the difference Vdata_sen−Vth between the sensing data voltage Vdata_sen for the threshold voltage and the threshold voltage of the driving transistor DRT.

When the voltage of the second node N2 of the driving transistor DRT is saturated, the sampling switch SAM is turned on, and the sampling period SAMPLING proceeds.

In the sampling period SAMPLING, the analog-to-digital converter ADC may detect the sensing voltage Vsen of the reference voltage line RVL connected by the sampling switch SAM, and convert the sensing voltage Vsen into sensing data corresponding to a digital value. Here, the sensing voltage Vsen transmitted by the analog-to-digital converter ADC corresponds to "Vdata_sen−Vth".

The compensation circuit COMP may identify a threshold voltage of the driving transistor DRT positioned in the corresponding subpixel SP based on sensing data output from the analog-to-digital converter ADC, and thus compensate for the threshold voltage of the driving transistor DRT.

In other words, the compensation circuit COMP may identify the threshold voltage Vth of the driving transistor DRT from the sensing data (digital data corresponding to Vdata_sen−Vth) measured through the threshold voltage sensing operation and the sensing data for the threshold voltage (digital data corresponding to Vdata_sen).

The compensation circuit COMP may compare the threshold voltage Vth identified for the corresponding driving transistor DRT with the reference threshold voltage or the threshold voltage of another driving transistor DRT to compensate for the threshold voltage deviation between the driving transistors DRT. Here, the deviation compensation of the threshold voltage may refer to a process of changing the data voltage Vdata to the compensation data voltage Vdata_comp, i.e., a process of multiplying the data voltage Vdata by the compensation gain G (e.g., Vdata_comp=G*Vdata).

Accordingly, when the deviation of the threshold voltage increases, the compensation gain G multiplied by the data voltage Vdata may increase.

As described above, while driving the gate driving circuit 120 with the test gate voltage, the sensing voltage Vsen for the characteristic value may be detected through the reference voltage line RVL.

The gate driving circuit 120 may perform a single output operation of outputting one scan signal, or an error may occur in multi-output of outputting a plurality of scan signals, within the N-phase scan clock according to the level of the test gate voltage.

The step S300 of determining whether the sensing voltage Vsen corresponds to the multi-output value is a process of determining whether one scan signal or a plurality of scan signals are output within the N-phase scan clock according to the level of the test gate voltage.

Figure 14:
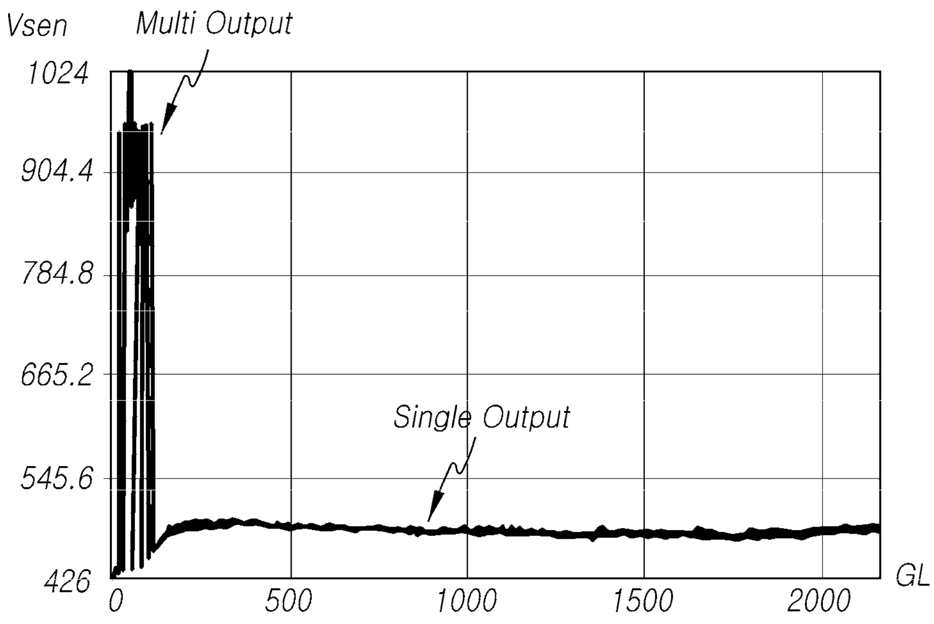
FIG. 14 is a view illustrating a sensing voltage when a single output or multiple outputs are generated according to a gate voltage in a display device according to embodiments of the disclosure.

FIG. 14 is a view illustrating a sensing voltage when a single output or multiple outputs are generated according to a gate voltage in a display device according to embodiments of the disclosure.

Referring to FIG. 14, in the display device 100 according to embodiments of the disclosure, the gate driving circuit 120 may perform a single output operation of outputting one scan signal, or an error in the multi-output of outputting a plurality of scan signals may occur within the N-phase scan clock according to the level of the test gate voltage.

When the gate driving circuit 120 performs a single output operation of outputting one scan signal within the N-phase scan clock, the sensing voltage Vsen detected through the reference voltage line RVL during the sensing period may represent a normal output value of a relatively low level.

On the other hand, when the gate driving circuit 120 performs multi-output of outputting the plurality of scan signals within the N-phase scan clock, at least twice the sensing voltage Vsen may be detected compared to the case of the normal operation.

For example, when two scan signals are output within the N-phase scan clock, about twice the sensing voltage Vsen may be detected compared to the case of the normal operation, and when three scan signals are output within the N-phase scan clock, about three times the sensing voltage Vsen may be detected compared to the case of the normal operation.

As described above, the display device 100 of the disclosure may detect the level of the sensing voltage Vsen detected through the reference voltage line RVL during the sensing period, thereby determining the deterioration state of the gate driving circuit 120 and the appropriateness for the level of the gate voltage.

When the sensing voltage Vsen corresponds to the multi-output value, the step S400 of setting the error gate voltage is a process of setting the gate voltage at the time when the sensing voltage Vsen detected through the reference voltage line RVL corresponds to the level of the multi-output as the error gate voltage.

The display device 100 according to the disclosure may set the gate voltage to a level which is a predetermined value greater than the error gate voltage, thereby preventing an error in which the gate driving circuit 120 generates multi-output and alleviating stress of transistors constituting the gate driving circuit 120.

In the step S500 of determining the stable gate voltage, a voltage higher than the error gate voltage at which the multi-output occurs may be determined as the stable gate voltage.

For example, when the gate voltage is 4V and multi-output occurs in the gate driving circuit 120, the error gate voltage may be 4V, and 10V, which is 6V higher than the error gate voltage, may be determined as the stable gate voltage.

In this case, the difference between the error gate voltage and the stable gate voltage may be referred to as a stabilization voltage capable of preventing multi-output of the gate driving circuit 120.

The magnitude of the stabilization voltage may vary depending on the size or structure of the display device 100 and, in the form of a lookup table, may be stored in the memory MEM of the timing controller 140.

The step S600 of applying the stable gate voltage to the gate driving circuit 120 is a process of controlling the level of the second high-potential gate voltage GVDD2 applied to the gate driving circuit 120 to the stable gate voltage according to the output (single output or multi output) state of the gate driving circuit 120.

Figure 15:
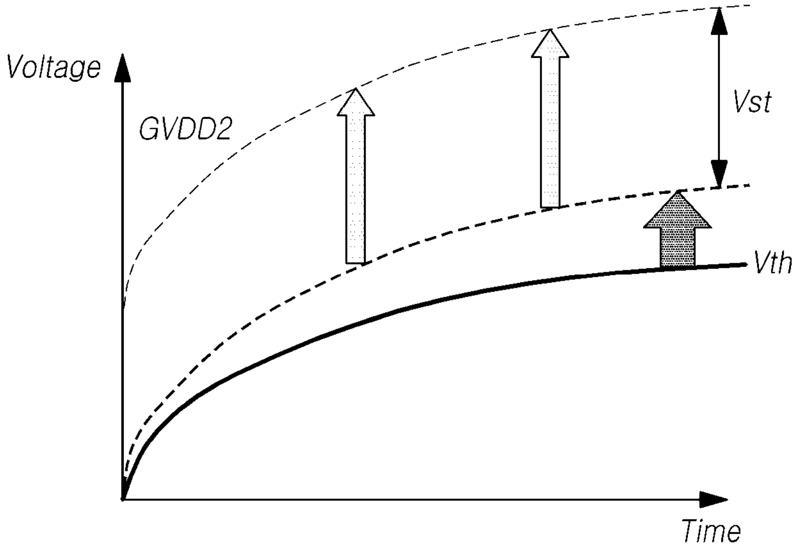
FIG. 15 is a view illustrating an example in which a gate voltage level is controlled according to a deterioration state of a gate driving circuit in a display device according to embodiments of the disclosure.

FIG. 15 is a view illustrating an example in which a gate voltage level is controlled according to a deterioration state of a gate driving circuit in a display device according to embodiments of the disclosure.

Referring to FIG. 15, in the display device 100 according to embodiments of the disclosure, as the driving time increases, the transistor constituting the gate driving integrated circuit GDIC may be deteriorated, and the threshold voltage Vth may increase.

In particular, the transistors T31 and T32 constituting the Q node stabilization unit 506 and the pull-down transistors T72, T74, T76, and T78 constituting the scan signal output unit 514 have their gate terminals connected to the QB node, and thus directly affect the deterioration of the gate driving integrated circuit GDIC.

Among them, the voltage corresponding to the difference between the high-potential gate voltage GVDD2 and the threshold voltage Vth acts as a stress in the transistors T31 and T32 constituting the Q node stabilization unit 506.

Accordingly, it is preferable that the second high-potential gate voltage GVDD2 applied to the gate driving integrated circuit GDIC maintains a difference not to cause a multi-output error in the gate driving circuit 120 while minimizing stress for the threshold voltage Vth of the transistors T31 and T32 constituting the Q node stabilization unit 506.

To this end, the display device 100 according to the disclosure may maintain the second high-potential gate voltage GVDD2 higher than the error gate voltage at which the multi-output error occurs in the gate driving circuit 120 by the stabilization voltage Vst, thereby minimizing stress on the transistors T31 and T32 constituting the Q node stabilization unit 506 and preventing the multi-output error from occurring in the gate driving circuit 120.

In other words, when the threshold voltage Vth of the transistor constituting the gate driving circuit 120 changes as the driving time increases, the display device 100 according to the disclosure may control the gate voltage to be higher than the threshold voltage Vth of the transistor by the stabilization voltage Vst, thereby enabling the stable operation of the gate driving circuit 120.

Embodiments of the disclosure described above are briefly described below.

A display device 100 of the disclosure may comprise a display panel 110 including a plurality of subpixels SP, a gate driving circuit 120 configured to supply a plurality of scan signals SCAN to the display panel 110 through a plurality of gate lines GL, a data driving circuit 130 configured to supply a plurality of data voltages to the display panel 110 through a plurality of data lines DL, a power management circuit 150 configured to supply a plurality of driving voltages to the gate driving circuit 120 and the data driving circuit 130, and a timing controller 140 controlling the power management circuit 150 to change a level of a gate voltage applied to the gate driving circuit 120 according to an output state of the gate driving circuit 120.

The gate driving circuit 120 may output N scan signals SCAN by N scan clocks SCCLK supplied sequentially (where N is a natural number) and include a plurality of gate driving integrated circuits GDIC outputting M scan signals SCAN (where M is a natural number smaller than N).

The gate driving integrated circuit GDIC may include a line selection unit 502 configured to charge an M node based on a previous carry signal in response to an input of a line sensing signal, a Q node control unit 504 configured to charge a Q node to a level of a first high-potential gate voltage GVDD1 in response to the previous carry signal and discharge the Q node to a level of a third low-potential gate voltage GVSS3 in response to an input of a subsequent carry signal, a Q node stabilization unit 506 configured to discharge the Q node and a QH node to the level of the third low-potential gate voltage GVSS3 in response to a voltage of a QB node, an inverter unit 508 configured to change a voltage level of the QB node into a second high-potential gate voltage GVDD2 according to a voltage level of the Q node, a QB node stabilization unit 510 configured to discharge the QB node to the level of the third low-potential gate voltage GVSS3 in response to the subsequent carry signal, a reset signal, and the charging voltage of the M node, a carry signal output unit 512 configured to output a carry signal based on a voltage level of a carry clock or the level of the third low-potential gate voltage GVSS3 according to the voltage level of the Q node or the voltage level of the QB node, and a scan signal output unit 514 configured to output a plurality of scan signals SCAN based on voltage levels of a plurality of scan clocks SCCLK or a level of a first low-potential gate voltage GVSS1 according to the voltage level of the Q node or the voltage level of the QB node.

The output state of the gate driving circuit 120 may include a single output state in which one scan signal among the N scan signals is output during a sensing period for sensing a characteristic value of the subpixel SP, and a multi-output state in which a plurality of scan signals among the N scan signals are output during the sensing period for sensing the characteristic value of the subpixel SP.

The output state of the gate driving circuit 120 may be determined based on a sensing voltage Vsen corresponding to the characteristic value of the subpixel SP.

The output state of the gate driving circuit 120 may be determined as the multi-output state when the sensing voltage Vsen is larger than or equal to a reference value.

When the output state of the gate driving circuit 120 is the multi-output state, the gate voltage may be changed into a level of a stable gate voltage higher than an error gate voltage corresponding to the multi-output state by a stabilization voltage Vst.

The gate voltage may correspond to the second high-potential gate voltage GVDD2.

A display driving method of the disclosure may comprise a step S100 of setting a test gate voltage, a step S200 of detecting a sensing voltage Vsen for a characteristic value of a subpixel SP disposed on a display panel 110, a step S300 of determining whether the sensing voltage Vsen corresponds to a multi-output value, a step S400 of setting the test gate voltage as an error gate voltage when the sensing voltage Vsen corresponds to the multi-output value, a step S500 of determining a stable gate voltage, and a step S600 of applying the stable gate voltage to a gate driving circuit 120.

The gate driving circuit 120 may output N scan signals SCAN by N scan clocks SCCLK supplied sequentially (where N is a natural number) and include a plurality of gate driving integrated circuits GDIC outputting M scan signals SCAN (where M is a natural number smaller than N).

The multi-output value may corresponds to a state in which a plurality of scan signals SCAN among the N scan signals SCAN are output.

The sensing voltage may be determined to correspond to the multi-output value when the sensing voltage Vsen is larger than or equal to a reference value.

The stable gate voltage may be a voltage of a level higher than the error gate voltage by a stabilization voltage Vst.

The gate driving integrated circuit GDIC may include a line selection unit 502 configured to charge an M node based on a previous carry signal in response to an input of a line sensing signal, a Q node control unit 504 configured to charge a Q node to a level of a first high-potential gate voltage GVDD1 in response to the previous carry signal and discharge the Q node to a level of a third low-potential gate voltage GVSS3 in response to an input of a subsequent carry signal, a Q node stabilization unit 506 configured to discharge the Q node and a QH node to the level of the third low-potential gate voltage GVSS3 in response to a voltage of a QB node, an inverter unit 508 configured to change a voltage level of the QB node into a second high-potential gate voltage GVDD2 according to a voltage level of the Q node, a QB node stabilization unit 510 configured to discharge the QB node to the level of the third low-potential gate voltage GVSS3 in response to the subsequent carry signal, a reset signal, and the charging voltage of the M node, a carry signal output unit 512 configured to output a carry signal based on a voltage level of a carry clock or the level of the third low-potential gate voltage GVSS3 according to the voltage level of the Q node or the voltage level of the QB node, and a scan signal output unit 514 configured to output a plurality of scan signals SCAN based on voltage levels of a plurality of scan clocks SCCLK or a level of a first low-potential gate voltage GVSS1 according to the voltage level of the Q node or the voltage level of the QB node. The stable gate voltage may correspond to the second high-potential gate voltage GVDD2.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles illustrated herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display device, comprising:

a display panel including a plurality of subpixels;

a gate driving circuit configured to supply a plurality of scan signals to the display panel through a plurality of respective gate lines;

a data driving circuit configured to supply a plurality of data voltages to the display panel through a plurality of respective data lines;

a power management circuit configured to supply a plurality of driving voltages to the gate driving circuit and the data driving circuit; and a timing controller configured to control the power management circuit to change a level of a gate voltage applied to the gate driving circuit according to an output state of the gate driving circuit during a sensing period for sensing a characteristic value of a subpixel of the plurality of subpixels.

2. The display device of claim 1, wherein the gate driving circuit outputs N scan signals by N scan clocks supplied sequentially, wherein N is a natural number, and wherein the gate driving circuit includes a plurality of gate driving integrated circuits outputting respective M scan signals, wherein M is a natural number smaller than N.

3. The display device of claim 2, wherein the gate driving integrated circuit includes:

a line selection unit configured to charge an M node based on a previous carry signal in response to a line sensing signal;

a Q node control unit configured to charge a Q node to a level of a first high-potential gate voltage in response to the previous carry signal and discharge the Q node to a level of a third low-potential gate voltage in response to a subsequent carry signal;

a Q node stabilization unit configured to discharge the Q node and a QH node to the level of the third low-potential gate voltage in response to a voltage of a QB node;

an inverter unit configured to change a voltage level of the QB node into a second high-potential gate voltage according to a voltage level of the Q node;

a QB node stabilization unit configured to discharge the QB node to the level of the third low-potential gate voltage in response to the subsequent carry signal, a reset signal, and the charging voltage of the M node;

a carry signal output unit configured to output a carry signal based on a voltage level of a carry clock or the level of the third low-potential gate voltage according to the voltage level of the Q node or the voltage level of the QB node; and a scan signal output unit configured to output a plurality of scan signals based on voltage levels of a plurality of scan clocks or a level of a first low-potential gate voltage according to the voltage level of the Q node or the voltage level of the QB node.

4. The display device of claim 3, wherein the output state of the gate driving circuit includes one or more of:

a single output state in which one scan signal among the N scan signals is output during the sensing period for sensing the characteristic value of the subpixel; or a multi-output state in which a plurality of scan signals among the N scan signals are output during the sensing period for sensing the characteristic value of the subpixel.

5. The display device of claim 4, wherein the output state of the gate driving circuit is determined based on a sensing voltage corresponding to the characteristic value of the subpixel.

6. The display device of claim 5, wherein the output state of the gate driving circuit is determined as the multi-output state in response to that the sensing voltage is greater than or equal to a reference value.

7. The display device of claim 4, wherein in response to that the output state of the gate driving circuit is the multi-output state, the gate voltage is changed into a level of a stable gate voltage higher than an error gate voltage corresponding to the multi-output state by a stabilization voltage.

8. The display device of claim 7, wherein the stable gate voltage corresponds to the second high-potential gate voltage.

9. The display device of claim 7, wherein the error gate voltage is the gate voltage in response to that the output state of the gate driving circuit is determined as the multi-output state, and wherein the stabilization voltage is stored in the timing controller in a form of a lookup table.

10. A method for display driving, comprising:
setting a test gate voltage;
detecting a sensing voltage for a characteristic value of a subpixel disposed on a display panel;
determining whether the sensing voltage corresponds to a multi-output value;
setting the test gate voltage as an error gate voltage in response to the sensing voltage is determined to correspond to the multi-output value;
determining a stable gate voltage; and
applying the stable gate voltage to a gate driving circuit.

11. The method of claim 10, wherein the gate driving circuit outputs N scan signals by N scan clocks supplied sequentially, wherein N is a natural number, and
wherein the gate driving circuit includes a plurality of gate driving integrated circuits outputting M scan signals, wherein M is a natural number smaller than N.

12. The method of claim 11, wherein the multi-output value corresponds to a state in which a plurality of scan signals among the N scan signals are output.

13. The method of claim 11, wherein the gate driving integrated circuit includes:
a line selection unit configured to charge an M node based on a previous carry signal in response to an input of a line sensing signal;
a Q node control unit configured to charge a Q node to a level of a first high-potential gate voltage in response to the previous carry signal and discharge the Q node to a level of a third low-potential gate voltage in response to an input of a subsequent carry signal;
a Q node stabilization unit configured to discharge the Q node and a QH node to the level of the third low-potential gate voltage in response to a voltage of a QB node;
an inverter unit configured to change a voltage level of the QB node into a second high-potential gate voltage according to a voltage level of the Q node;
a QB node stabilization unit configured to discharge the QB node to the level of the third low-potential gate voltage in response to the subsequent carry signal, a reset signal, and the charging voltage of the M node;
a carry signal output unit configured to output a carry signal based on a voltage level of a carry clock or the level of the third low-potential gate voltage according to the voltage level of the Q node or the voltage level of the QB node; and
a scan signal output unit configured to output a plurality of scan signals based on voltage levels of a plurality of scan clocks or a level of a first low-potential gate voltage according to the voltage level of the Q node or the voltage level of the QB node, and
wherein the stable gate voltage corresponds to the second high-potential gate voltage.

14. The method of claim 10, wherein the sensing voltage is determined to correspond to the multi-output value based on that the sensing voltage is larger than or equal to a reference value.

15. The method of claim 10, wherein the stable gate voltage is a voltage of a level higher than the error gate voltage by a stabilization voltage.

16. The method of claim 15, wherein the sensing voltage for the characteristic value of the subpixel is detected through a reference voltage line in response to that the test gate voltage is applied to a gate driving circuit, and
wherein the stabilization voltage is stored in advance in a form of a lookup table.

17. A display device, comprising:
a display panel including a plurality of subpixels;
a gate driving circuit configured to supply a plurality of scan signals to the display panel through a plurality of respective gate lines;
a data driving circuit configured to supply a plurality of data voltages to the display panel through a plurality of respective data lines;
a power management circuit configured to supply a plurality of driving voltages to the gate driving circuit and the data driving circuit; and
a timing controller configured to control the power management circuit to change a level of a gate voltage applied to the gate driving circuit according to an output state of the gate driving circuit,
wherein the output state of the gate driving circuit includes one or more of:
a single output state in which one scan signal among the N scan signals is output during a sensing period for sensing a characteristic value of the subpixel; or
a multi-output state in which a plurality of scan signals among the N scan signals are output during the sensing period for sensing the characteristic value of the subpixel.

18. The display device of claim 17, wherein the output state of the gate driving circuit is determined based on a sensing voltage corresponding to the characteristic value of the subpixel.

19. The display device of claim 18, wherein the output state of the gate driving circuit is determined as the multi-output state in response to that the sensing voltage is greater than or equal to a reference value.

20. The display device of claim 17, wherein in response to that the output state of the gate driving circuit is the multi-output state, the gate voltage is changed into a level of a stable gate voltage higher than an error gate voltage corresponding to the multi-output state by a stabilization voltage.

* * * * *